US012760484B2

(12) United States Patent
Hartog et al.

(10) Patent No.: US 12,760,484 B2
(45) Date of Patent: Oct. 13, 2026

(54) APPARATUS FOR SERVICING A STRUCTURE

(71) Applicant: RotoTech Pte Ltd., Singapore (SG)

(72) Inventors: Simon Hartog, Singapore (SG); Andries Vos, Beilen (NL); Peter Kleine, Beilen (NL); Michael Westerbrink, Beilen (NL); Stuart Kendall, Singapore (SG)

(73) Assignee: RotoTech Pte Ltd., Singapore (SG)

( * ) Notice: Subject to any disclaimer, the term of this patent is extended or adjusted under 35 U.S.C. 154(b) by 772 days.

(21) Appl. No.: 17/315,024

(22) Filed: May 7, 2021

(65) Prior Publication Data

US 2021/0262186 A1 Aug. 26, 2021

Related U.S. Application Data

(63) Continuation-in-part of application No. PCT/SG2019/050550, filed on Nov. 11, 2019.

(30) Foreign Application Priority Data

Nov. 9, 2018 (GB) ..................................... 1818300

(51) Int. Cl.
*E02B 17/00* (2006.01)
*B08B 9/023* (2006.01)

(52) U.S. Cl.
CPC .......... *E02B 17/0034* (2013.01); *B08B 9/023* (2013.01)

(58) Field of Classification Search
CPC .... G01V 13/00; G01H 3/005; B05B 13/0214; B05B 13/0436; E02B 17/0034; E02B 17/00; B08B 9/023; Y10S 118/11; B23D 57/00; B23D 57/0084
See application file for complete search history.

(56) References Cited

U.S. PATENT DOCUMENTS

| | | | | |
|---|---|---|---|---|
| 1,898,964 A * | 2/1933 | Jinnett | .................... | B08B 9/023 15/104.04 |
| 2,307,449 A * | 1/1943 | Carpmail | ................ | B08B 9/023 15/88 |
| 2,359,751 A * | 10/1944 | Cummings | ............ | B65H 81/08 118/208 |

(Continued)

FOREIGN PATENT DOCUMENTS

| | | |
|---|---|---|
| AU | 3681784 A | 6/1985 |
| CN | 1902398 A | 1/2007 |

(Continued)

OTHER PUBLICATIONS

International Search Report and Written Opinion mailed Apr. 6, 2020, issued in connection with International Application No. PCT/SG2019/050550 (18 pages).

(Continued)

*Primary Examiner* — Edwin J Toledo-Duran
(74) *Attorney, Agent, or Firm* — McCarter & English, LLP

(57) ABSTRACT

Apparatus for servicing a structure comprises a frame for assembly around the structure, the frame having least one pair of first and second arms pivotally attached at proximal ends thereof to the frame and carrying respective rotating members arranged to contact the structure and driveable to move the frame along the structure.

18 Claims, 21 Drawing Sheets

(56) References Cited

U.S. PATENT DOCUMENTS

| | | | | |
|---|---|---|---|---|
| 2,427,129 | A * | 9/1947 | Fields | B08B 9/023 15/88 |
| 2,470,994 | A * | 5/1949 | Kremko | B05B 13/04 118/DIG. 11 |
| 2,769,468 | A * | 11/1956 | Swanson | B27L 1/10 15/198 |
| 3,495,288 | A * | 2/1970 | Ford | B08B 9/023 15/88 |
| 3,641,608 | A * | 2/1972 | Kratt | B21B 28/02 15/88 |
| 3,916,469 | A * | 11/1975 | Anthem | B08B 9/023 15/104.04 |
| 3,933,519 | A | 1/1976 | Koch et al. | |
| 3,952,526 | A | 4/1976 | Watkins | |
| 3,994,766 | A * | 11/1976 | Dedels | B08B 9/023 156/577 |
| 4,007,705 | A * | 2/1977 | Sherer | B05B 13/0436 118/710 |
| 4,036,173 | A * | 7/1977 | Nicklas | B08B 9/0433 451/76 |
| 4,091,514 | A * | 5/1978 | Motes-Conners | F16L 1/26 228/32 |
| 4,144,867 | A * | 3/1979 | Wachs | B28D 1/04 125/14 |
| 4,205,407 | A * | 6/1980 | King | B08B 9/023 15/179 |
| 4,205,694 | A * | 6/1980 | Thompson | B05B 13/0214 118/DIG. 11 |
| 4,244,296 | A * | 1/1981 | Vertut | F16L 55/28 376/245 |
| 4,290,123 | A * | 9/1981 | Pickens | G01V 13/00 367/19 |
| 4,677,998 | A * | 7/1987 | van Voskuilen | F16L 58/02 134/172 |
| 4,705,331 | A | 11/1987 | Britton | |
| 4,716,271 | A * | 12/1987 | Hulsizer | B23Q 9/0021 219/60 R |
| 4,732,507 | A * | 3/1988 | Artzberger | E01C 19/283 404/127 |
| 4,893,512 | A | 1/1990 | Tanimoto et al. | |
| 5,069,234 | A * | 12/1991 | Nielsen | B08B 9/023 451/92 |
| 5,085,016 | A * | 2/1992 | Rose | B24C 3/32 451/92 |
| 5,136,969 | A * | 8/1992 | Chapman | F16L 55/168 118/305 |
| 5,199,226 | A * | 4/1993 | Rose | B24C 3/32 118/313 |
| 5,520,734 | A * | 5/1996 | Taylor | F16L 45/00 134/180 |
| 5,624,207 | A * | 4/1997 | Berges | B63B 35/04 226/181 |
| 5,626,438 | A * | 5/1997 | Etheridge | E02F 5/104 15/104.04 |
| 5,720,070 | A * | 2/1998 | Kelley | B08B 9/023 15/104.04 |
| 6,164,875 | A * | 12/2000 | Wu | E02D 17/08 405/282 |
| 6,371,696 | B1 * | 4/2002 | Eathorne | E02B 17/0034 405/211.1 |
| 6,988,458 | B1 | 1/2006 | Walker | |
| 8,007,595 | B2 | 8/2011 | Hall | |
| 8,105,442 | B2 | 1/2012 | Hall | |
| 8,465,228 | B2 | 6/2013 | Doleshal | |
| 8,619,134 | B2 | 12/2013 | Christ | |
| 8,844,463 | B2 | 9/2014 | Bamford | |
| 9,216,879 | B1 * | 12/2015 | Fuselier | E02B 15/06 |
| 9,339,670 | B1 | 5/2016 | Burnham et al. | |
| 9,382,682 | B2 | 7/2016 | Doleshal | |
| 9,404,773 | B2 | 8/2016 | Chang et al. | |
| 10,487,806 | B2 | 11/2019 | Huot et al. | |
| 10,495,583 | B2 | 12/2019 | Blunk | |
| 10,508,516 | B2 | 12/2019 | Angel et al. | |
| 10,656,120 | B2 | 5/2020 | Ruttanasupa et al. | |
| 10,900,295 | B2 * | 1/2021 | Scoville | E21B 17/01 |
| 11,458,571 | B2 | 10/2022 | Rajagopalan et al. | |
| 2003/0180097 | A1 | 9/2003 | Fitzgerald et al. | |
| 2010/0226724 | A1 | 9/2010 | Doleshal | |
| 2010/0235018 | A1 | 9/2010 | Christ | |
| 2011/0097157 | A1 * | 4/2011 | Swiatowy | B23C 5/109 405/184.1 |
| 2011/0140059 | A1 * | 6/2011 | Krone | E02B 17/0034 254/387 |
| 2011/0159192 | A1 | 6/2011 | Daykin et al. | |
| 2014/0054390 | A1 | 2/2014 | Oliver | |
| 2014/0158171 | A1 | 6/2014 | Doleshal | |
| 2014/0311748 | A1 | 10/2014 | Angel et al. | |
| 2016/0059939 | A1 * | 3/2016 | Lamonby | G01V 13/00 114/337 |
| 2016/0207167 | A1 * | 7/2016 | Daykin | B08B 13/00 |
| 2018/0154954 | A1 * | 6/2018 | Bagheri | B62D 55/14 |
| 2018/0208283 | A1 | 7/2018 | Munro et al. | |
| 2019/0134824 | A1 | 5/2019 | Seavey | |
| 2019/0161932 | A1 | 5/2019 | Foster | |
| 2020/0347960 | A1 * | 11/2020 | Roodenburg | F16L 1/207 |
| 2021/0047009 | A1 * | 2/2021 | Roodenburg | B63B 35/003 |
| 2023/0051368 | A1 * | 2/2023 | Fang | E02D 13/04 |
| 2024/0384489 | A1 | 11/2024 | Hartog | |
| 2025/0003166 | A1 | 1/2025 | Hartog et al. | |
| 2025/0178704 | A1 | 6/2025 | Hartog et al. | |

FOREIGN PATENT DOCUMENTS

| | | | |
|---|---|---|---|
| CN | 107002910 | A | 8/2017 |
| CN | 107314190 | A | 11/2017 |
| CN | 108555940 | A | 9/2018 |
| CN | 110977708 | A | 4/2020 |
| EP | 0139596 | A2 | 5/1985 |
| EP | 243408 | A1 | 11/1987 |
| EP | 1003669 | A1 | 5/2000 |
| EP | 2600051 | A1 | 6/2013 |
| EP | 3867451 | B1 | 4/2022 |
| GB | 2531893 | A | 5/2016 |
| GB | 2542605 | A | 3/2017 |
| GB | 2578876 | B | 1/2021 |
| GB | 2591715 | B | 4/2022 |
| JP | 2011026802 | A | 2/2011 |
| JP | 2018119873 | A | 8/2018 |
| KR | 20160015994 | A | 2/2016 |
| WO | 86/06696 | A1 | 11/1986 |
| WO | 87/02640 | A1 | 5/1987 |
| WO | 99/10232 | A1 | 3/1999 |
| WO | 2010/048039 | A2 | 4/2010 |
| WO | 2018/023140 | A1 | 2/2018 |
| WO | 2018/057250 | A1 | 3/2018 |
| WO | 2019/069846 | A1 | 4/2019 |
| WO | 2019/144227 | A1 | 8/2019 |
| WO | 2020/096529 | A1 | 5/2020 |
| WO | 2020/192856 | A1 | 10/2020 |
| WO | 2022/191710 | A1 | 9/2022 |

OTHER PUBLICATIONS

International Preliminary Report on Patentability mailed Feb. 12, 2021 in connection with International Application No. PCT/SG2019/050550, including annexed copy of Response to Written Opinion filed on Aug. 28, 2020 (14 pages).

Combined Search and Examination Report dated Dec. 24, 2018, issued in connection with UK Patent Application No. GB 1818300.4 (6 pages).

IAS Group, "Splash Genius—Remotely Operated Ultra High Pressure Water Jet Cleaning Tool," <www.ias-group.com.au/view/video-articles/splash-genius-cleaning-tool>, 2015 (accessed on May 7, 2021) (2 pages).

BRI NorHull, "Pipe Robots," <www.brioffshore.no/pipe-robot>, 2017 (accessed on May 7, 2021) (3 pages).

Japanese Office Action dated Jan. 30, 2023, issued in connection with Japanese Patent Application No. 2021-525034 (26 pages, including English-language translation).

(56) References Cited

OTHER PUBLICATIONS

Notification of Intention to Grant dated Nov. 4, 2020, issued in connection with UK Patent Application No. GB1818300.4 (2 pages).
Combined Examination Report and Notification of Intention to Grant dated Dec. 15, 2021, issued in connection with UK Patent Application No. GB2107240.0 (2 pages).
Chinese Office Action issued Mar. 30, 2022, in connection with Chinese Patent Application No. 201980088677.6 (10 pages, including English-language translation).
PCT International Search Report and Written Opinion dated Sep. 28, 2022, in connection with Int'l Application No. PCT/GB2022/051809 (10 pages).
International Preliminary Report on Patentability dated Jan. 26, 2023, in connection with Int'l Application No. PCT/GB2022/051809 (6 pages).
Search Report dated Dec. 14, 2021, in connection with UK Patent Application No. GB2110101.9 (4 pages).
International Search Report of the International Searching Authority mailed on Nov. 15, 2022, issued in connection with International Application No. PCT/GB2022/052179 (3 pages).
Written Opinion of the International Searching Authority mailed on Nov. 15, 2022, issued in connection with International Application No. PCT/GB2022/052179 (5 pages).
Combined Search and Examination Report dated Dec. 14, 2021, issued in connection with UK Patent Application No. GB2113391.3 (2 pages).
Examination Report dated Nov. 29, 2023, issued in connection with UK Patent Application No. GB2113391.3 (3 pages).
Notice of Intention to Grant dated Feb. 9, 2024, issued in connection with UK Patent Application No. GB2113391.3 (2 pages).
International Search Report mailed Jun. 21, 2023, issued in connection with International Application No. PCT/GB2023/050529 (4 pages).
Written Opinion of International Search Authority mailed Jul. 2022, Issued in connection with International Application PCT/GB2023050529 (5 pages).
Translation of Examination Report dispatched on Jan. 6, 2025, in connection with Japanese Patent Application No. JP 2023-207549 (13 pages).
Office Action dated Sep. 8, 2025, issued in connection with U.S. Appl. No. 18/689,690 (9 pages).
Office Action dated Mar. 26, 2026, issued in connection with U.S. Appl. No. 18/689,690 (15 pages).
Japanese Office Action, along with an English translation, dated Apr. 8, 2026, issued by the Japanese Patent Office in connection with Japanese Patent Application No. 2024-517168 (16 pages).
Office Action dated May 21, 2026, issued in connection with U.S. Appl. No. 18/578,701 (11 pages).
Office Action dated Jul. 16, 2026, issued in connection with U.S. Appl. No. 18/689,690 (5 pages).
Notice of Examination Opinion dated Jul. 20, 2026, along with an English translation, issued by the Taiwan Patent Office in connection with Taiwan Patent Application No. 112107975 (13 pages).
Office Action dated Jul. 23, 2026, issued in connection with U.S. Appl. No. 18/843,987 (7 pages).

* cited by examiner

APPARATUS FOR SERVICING A STRUCTURE

RELATED APPLICATIONS

This application is a continuation-in-part of International Application No. PCT/SG2019/050550 filed on Nov. 11, 2019 and published on May 14, 2020 under WIPO Publication Number WO 2020/096529 A1, which claims the benefit of priority to United Kingdom Patent Application No. GB 1818300.4 filed on Nov. 9, 2018 and issued on Jan. 20, 2021 as United Kingdom Patent No. GB 2578876 B, the disclosures of each of which are expressly incorporated herein by reference in their entireties.

FIELD OF THE INVENTION

The present invention relates to apparatus for servicing a structure, such as a support structure including but not limited to marine support structures such as risers, conductors, caissons piles, or legs for marine platforms, jetties or wharves, or pipes, and land-based or offshore structures such as wind turbine towers.

BACKGROUND OF THE INVENTION

Marine support structures typically suffer from ageing and degradation, particularly in the 'splash zone', which is the part of the structure that is periodically covered and uncovered by water, for example as a result of tidal range, wave action and/or splashing. Ageing may include corrosion and physical damage caused by wave action and impacts. Degradation may include accumulation of marine growth, such as weed, barnacles etc.

Marine support structures therefore need to be serviced, for example by cleaning, inspection, and coating or painting, to ensure continued performance and to extend their life. Conventionally, servicing is carried out by divers but this can be extremely difficult and hazardous, particularly in the splash zone, and is often not fully effective.

U.S. Pat. No. 9,382,682 discloses apparatus for cleaning marine debris from a pile, comprising a truss cage comprising two halves that are fastened around a pile, and traction motors with caterpillar treads for vertical movement. A trolley rides along tracks on the outside of the frame and carries a water jet for cleaning the pile.

Land-based or offshore structures such as wind turbine towers also require maintenance and may not be easily accessible, whether due to their height or their location.

SUMMARY

Aspects of the invention are defined by the accompanying claims.

According to one embodiment, there is provided apparatus for servicing a structure, comprising a frame for assembly or positioning around the structure, the frame including first and second supports at axially opposite ends thereof; at least one pair of first and second support arms pivotally attached at proximal ends thereof to the first support and carrying respective rotating members arranged to contact the structure and driveable to move the frame along the structure; and a carriage arranged for circumferential movement, carrying one or more tools for servicing the structure.

The above arrangement may advantageously allow tools to be mounted on the frame without interference from the rotating members and arms, as these are mounted at the opposite end of the frame from the carriage.

The above arrangement may advantageously allow the arms to be easily accessed, for example for assembly, particularly where they are provided at an upper end of the frame.

The arms may be removably attached to the frame, for example to facilitate assembly and/or to allow the arms to be attached to frames of different sizes, for servicing structures of different sizes.

The apparatus may be provided as a kit of parts including frames or frame sections of different sizes, to which the arms may be interchangeably attached. This aspect is considered to be independently inventive. Hence, in another aspect of the invention, there is provided apparatus for servicing structures of different sizes, comprising frames or frame components of different sizes for assembly around a structure, at least one arm interchangeably attachable to each said frame, said arm having a rotating member arranged to contact the structure and driveable to move the frame along the structure; and a carriage arranged to carry one or more tools for servicing the structure.

The frame may be cylindrical in form, without the need for concentric parts at different radii, thus allowing the frame to be relatively light and/or compact.

The first and second arms may extend in opposite axial directions, such that the first arm extends beyond an end of the frame, and the second arm extends through the frame, for example through an aperture between struts that connect the first and second supports together. This may also allow the apparatus to be light and compact.

The arms may be independently attached to the first support. The arms may be driven by hydraulic cylinders, allowing the pivot angles of the arms, which carry the rotating members, to be altered as the frame moves along the structure. This may improve to the ability of the apparatus to move over obstacles, such as pre-wrapped composite wrappings, pipe unions or other such obstructions. This arrangement may allow or facilitate the apparatus to climb a tapered structure.

The above arrangement of the second arm is considered to be independently inventive. Hence, in another aspect of the invention, there is provided apparatus for servicing a structure, comprising a frame for assembly or positioning around the structure, an arm pivotally attached to one axial end of the frame and carrying a rotating member arranged to contact the structure and driveable to move the frame along the structure; and a carriage arranged at the other axial end of the structure; wherein the arm extends through the frame.

The apparatus may include one or more distance or position sensors arranged to determine the absolute or relative position of at least part of the apparatus relative to the structure, for example the distance travelled by the frame along the structure and/or the circumferential position of the carriage. This aspect is considered to be independently inventive, and according to another aspect of the invention there is provided apparatus for servicing a structure, comprising: a frame for assembly or arrangement around the structure; an arm attached to the frame, carrying a rotating member arranged to contact the structure and driveable to move the frame along the structure; and a tool carriage attached to the frame and moveable circumferentially relative to the frame, the apparatus including one or more distance sensors arranged to sense a distance moved by the frame along the structure, and one or more circumferential position sensors arranged to detect a circumferential position of the tool carriage.

According to another embodiment of the invention, there is provided apparatus for servicing a structure, comprising: a frame for assembly or arrangement around the structure, the frame including a support at a position intermediate axial ends of the frame; at least one pair of first and second arms pivotally attached at proximal ends thereof to the support; and at least one pair of first and second rotating members, attached to distal ends of the respective first and second arms, for contact with the structure; the first and second arms extending in axially opposite directions and being pivotable so as to move the corresponding first and second rotating members towards or away from the structure.

The apparatus may comprise a first module connectable to one or more additional modules in series along the structure, the first module being configured as a traction or drive module and the additional module(s) being configured for servicing the structure.

BRIEF DESCRIPTION OF THE DRAWINGS

Specific embodiments of the present invention will now be described with reference to the accompanying drawings, in which.

DETAILED DESCRIPTION OF EMBODIMENTS

Figure 1:
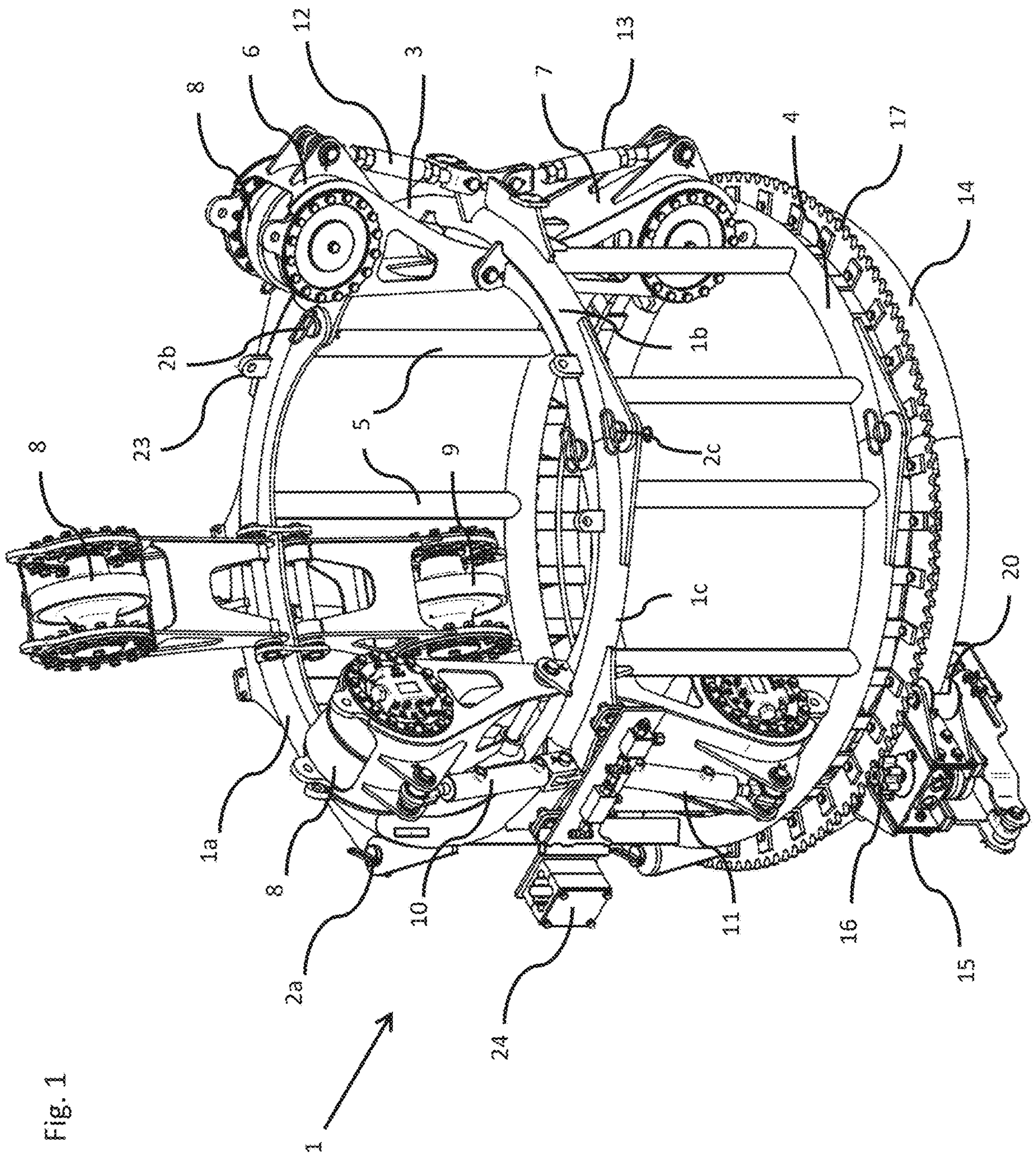
FIG. 1 is a perspective view from above of an apparatus in a first embodiment of the invention.
Figure 2:
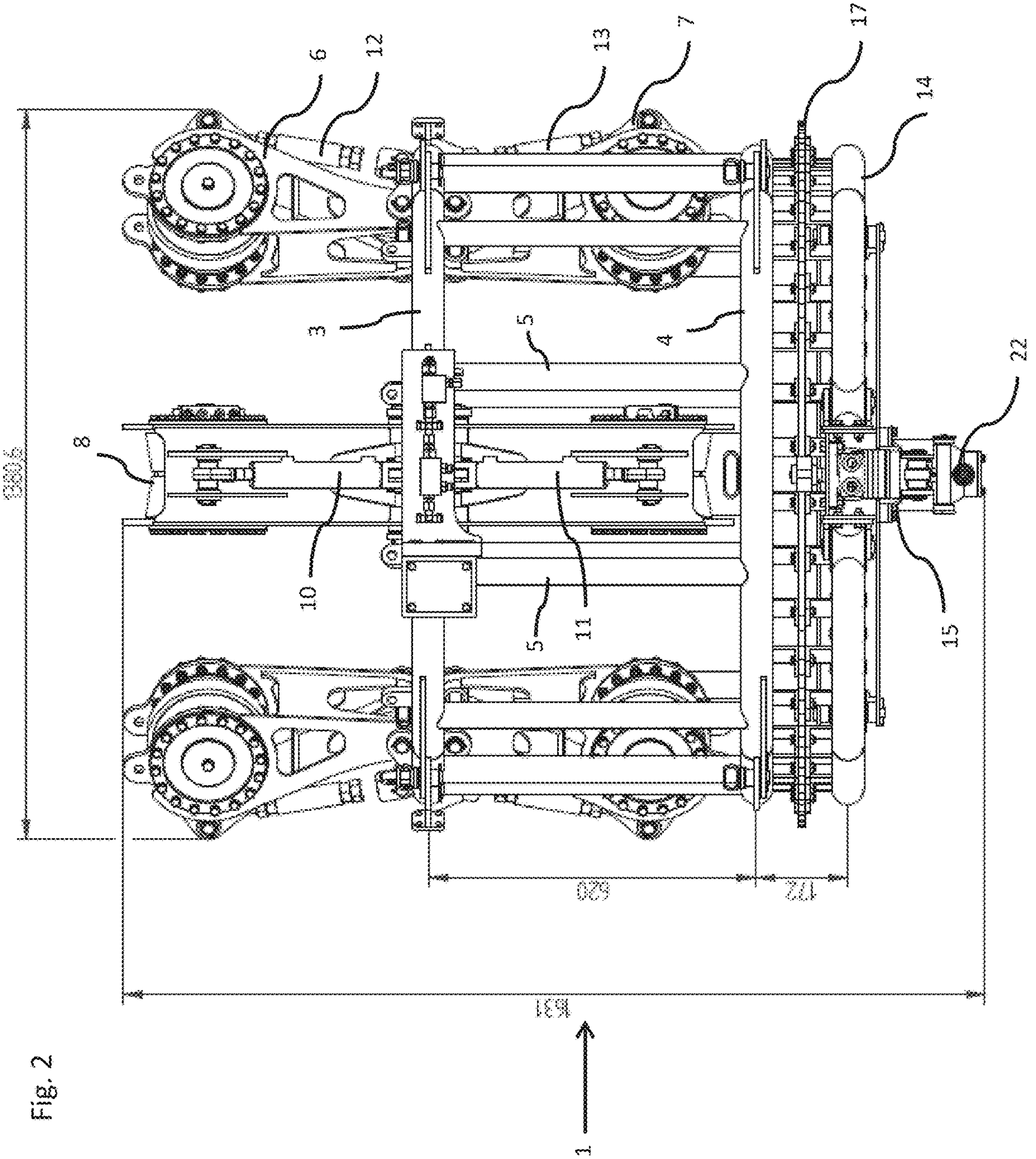
FIG. 2 is a first side elevation of the apparatus of the first embodiment.
Figure 3:
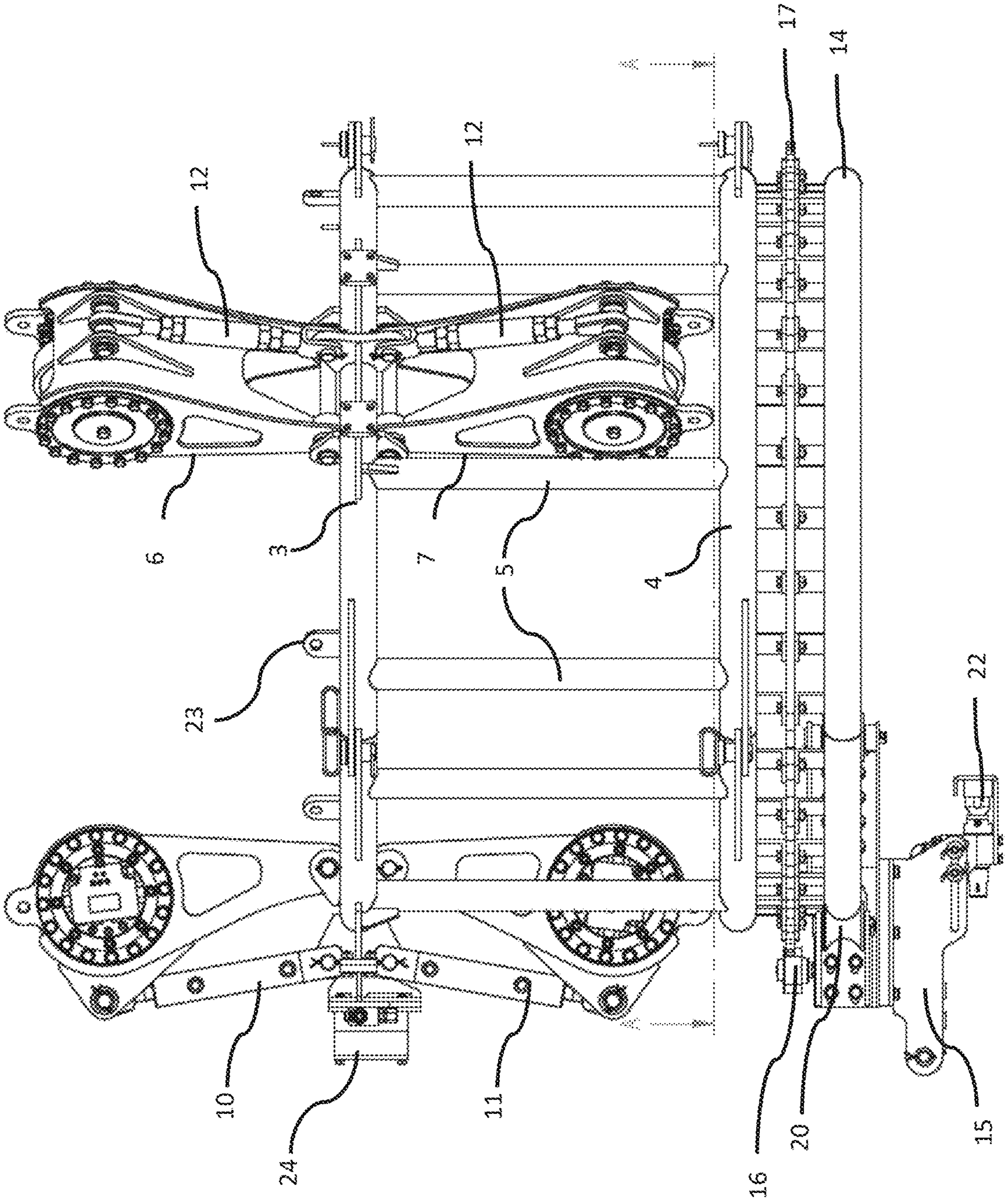
FIG. 3 is a second side elevation of the apparatus of the first embodiment, orthogonal to the first side elevation.

In the description below, the orientation of the apparatus will be described as assembled around a vertically elongate support structure 30. 'Circumferential' and 'tangential' refers to a circumference around a notional central vertical axis, and 'radial' to a direction perpendicular to that axis.

Where dimensions are shown in the drawings, these are given in millimetres. The dimensions are not limiting on the size of specific embodiments and are provided purely by way of example.

For clarity, not all instances of a particular part are indicated by reference numerals in the drawings. It will be understood by inspection of the drawings as a whole which parts are referred to. Similar parts between different embodiments are indicated by the same reference numeral.

A first embodiment of the invention is described below with reference to FIGS. 1 to 5. A cage or frame 1 comprises cage or frame segments or sections 1*a*, 1*b*, 1*c* which are removeably connected together at frame connection points 2*a*, 2*b*, 2*c*, for example using removable pins. In use, the frame segments 1*a*, 1*b*, 1*c* are assembled around the support structure 30 to be serviced. The frame segments 1*a*, 1*b*, 1*c* include lifting points 23 for attachment of cables or the like, for lifting the frame segments 1*a*, 1*b*, 1*c* into position and/or for retrieving them after use. Preferably, each frame segment 1*a*, 1*b*, 1*c* is light enough to be manually lifted into position.

The frame 1 comprises an upper support 3 and a lower support 4, interconnected by struts 5. In this embodiment, the upper and lower supports 3, 4 are circular in shape, and coaxial. The struts 5 extend generally vertically between the upper and lower supports 3, 4. The upper support 3, lower support 4 and struts 5 are preferably substantially rigid and are connected together so that the frame 1, when assembled, is substantially rigid.

A plurality of (in this case 3) pairs of upper and lower arms 6, 7 are connected to the upper support 3 at different circumferential positions, preferably evenly circumferentially spaced around the upper support 3, for example by 120° in this embodiment.

Each arm 6, 7 is pivotally connected to the upper support 3 about a tangential, horizontal pivot axis, for example by means of a respective axle or spindle. In this embodiment, the arms 6, 7 are pivotable about respective axes on the upper and lower sides of the upper support 3, but may alternatively be pivotable about the same axis. The upper and lower arms 6, 7 are pivotable in opposite directions relative to each other so that they can both simultaneously move towards the support structure 30 or away from the support structure 30. The upper and lower arms 6, 7 may be pivotable independently of each other, so that the angle between the upper and lower arms 6, 7 may vary.

Each arm 6, 7 carries a respective wheel, roller or other rotating member 8, 9 arranged to contact the support structure 30. The wheels 8, 9 may have contact surfaces arranged to enhance traction against the support structure 30 and/or to reduce wear to the wheels 8, 9. Each pair of wheels 8, 9, carried by a corresponding pair of arms 6, 7, may be mutually independently rotatable.

At least one of the pairs of arms 6, 7 are reciprocally driveable to pivot towards and away from the support structure 30 so that the corresponding wheels 8, 9 respectively clamp and release the support structure 30. Preferably, this pair of arms 6, 7 is driven by respective hydraulic cylinders 10, 11. The control of the hydraulic cylinders 10, 11 may be interconnected so that the pair of arms is driven in synchronism. The hydraulic cylinders 10, 11 may be supplied by respective hydraulic hoses (not shown), secured by a hose clamp 24.

Others of the pairs of arms 6, 7 may be adjustably held in a pivotal position, for example by adjustable length bars or bottle screws 12, 13, according to the diameter of the support structure 30 to be serviced.

The lower arms 7 are arranged to pass between the struts 5 to enable the corresponding wheels 9 to contact the support structure 30.

At least one of the wheels 8, 9 is driveable reciprocally in either one of opposite directions (e.g. forward and backward) so as to move the apparatus respectively up and down the support structure 30. Preferably, the driveable wheel(s) 8, 9 are provided on the reciprocally driveable arms 6, 7. Others of the wheels 8, 9 may not be driven, but may freely rotate, preferably independently of each other, so as to act as guides for movement of the apparatus up and down the support structure 30.

Figure 4:
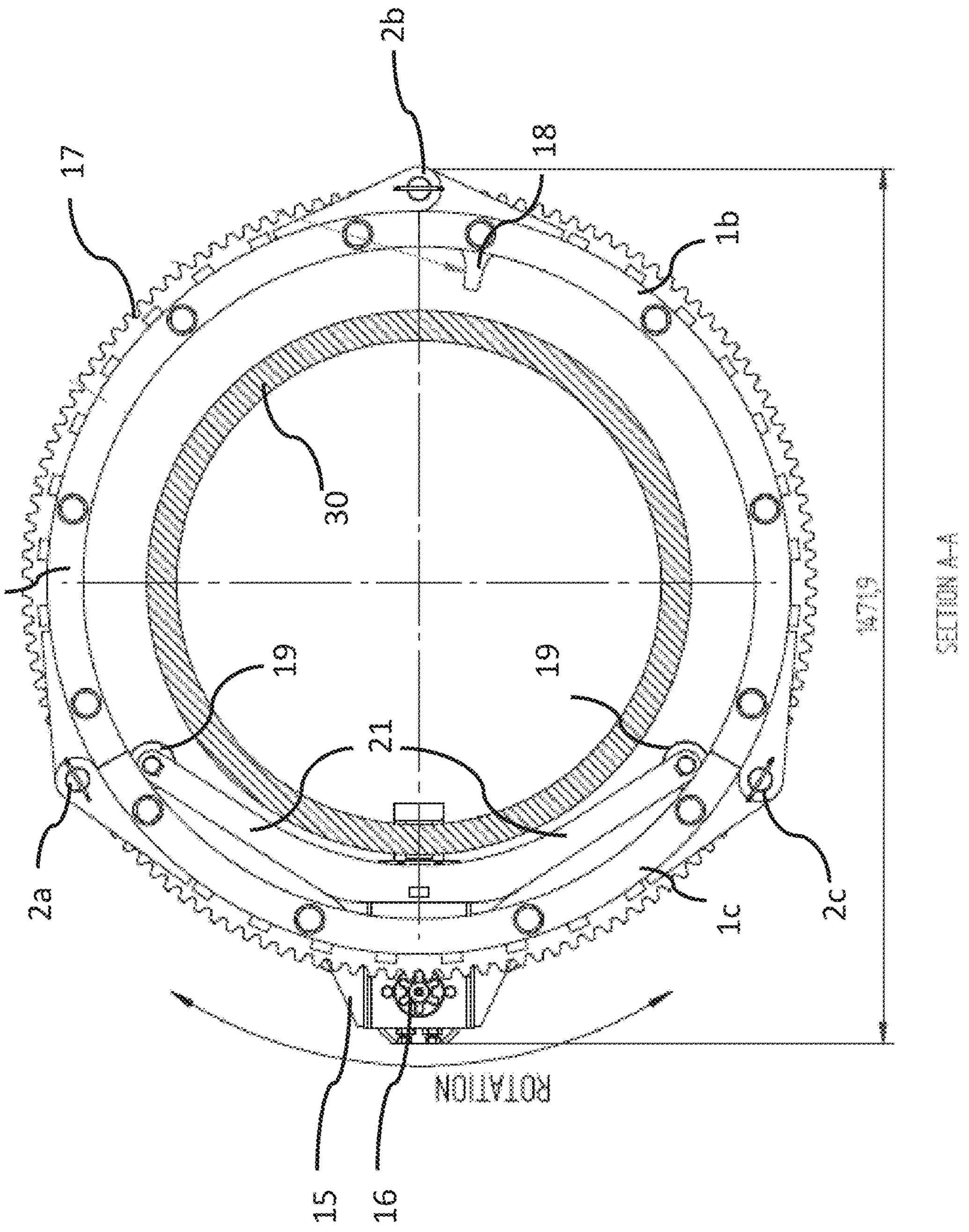
FIG. 4 is a cross-section through the plane A-A in FIG. 2, indicating the position of a support structure.
Figure 5:
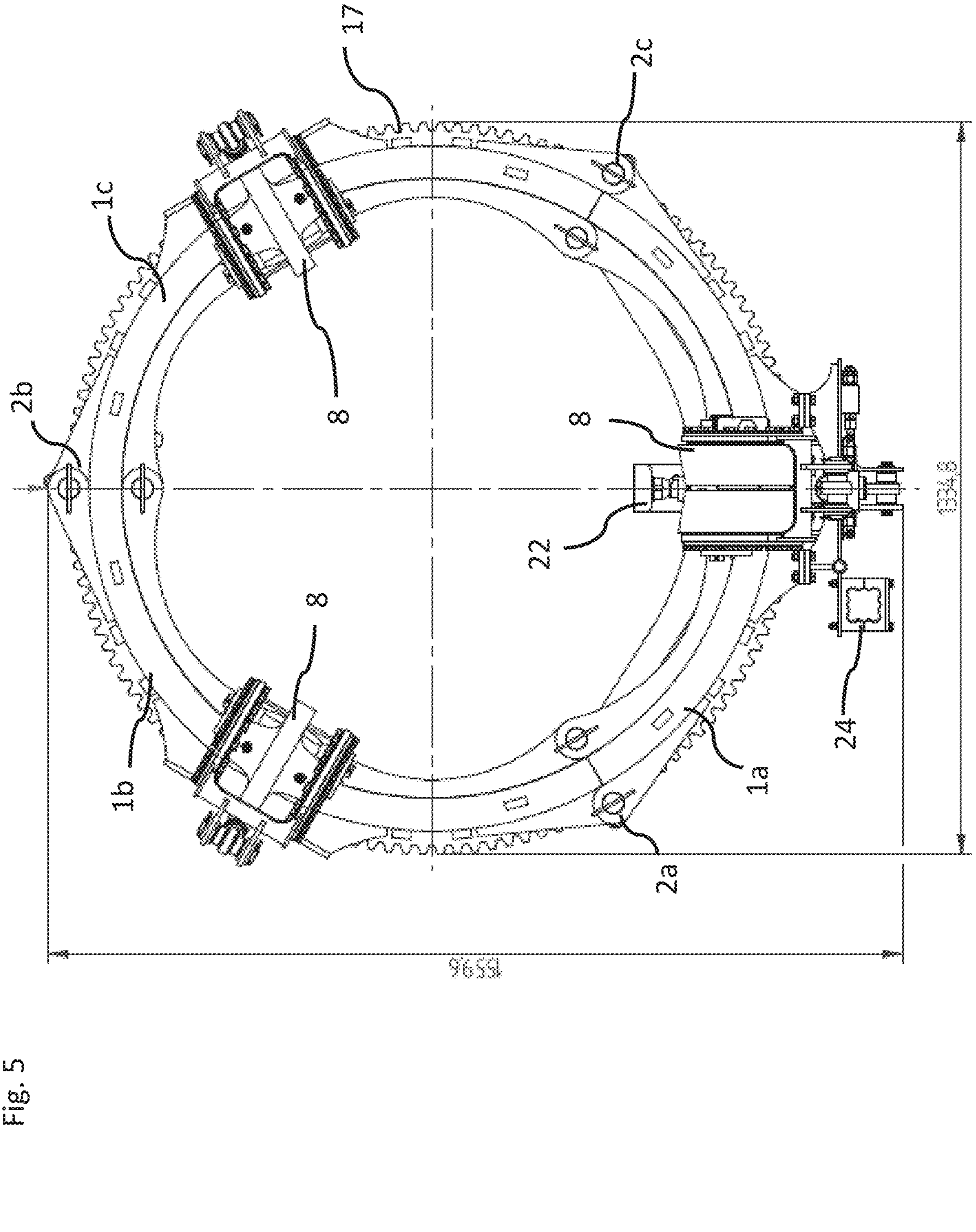
FIG. 5 is a top view of the apparatus of the first embodiment.
Figure 6:
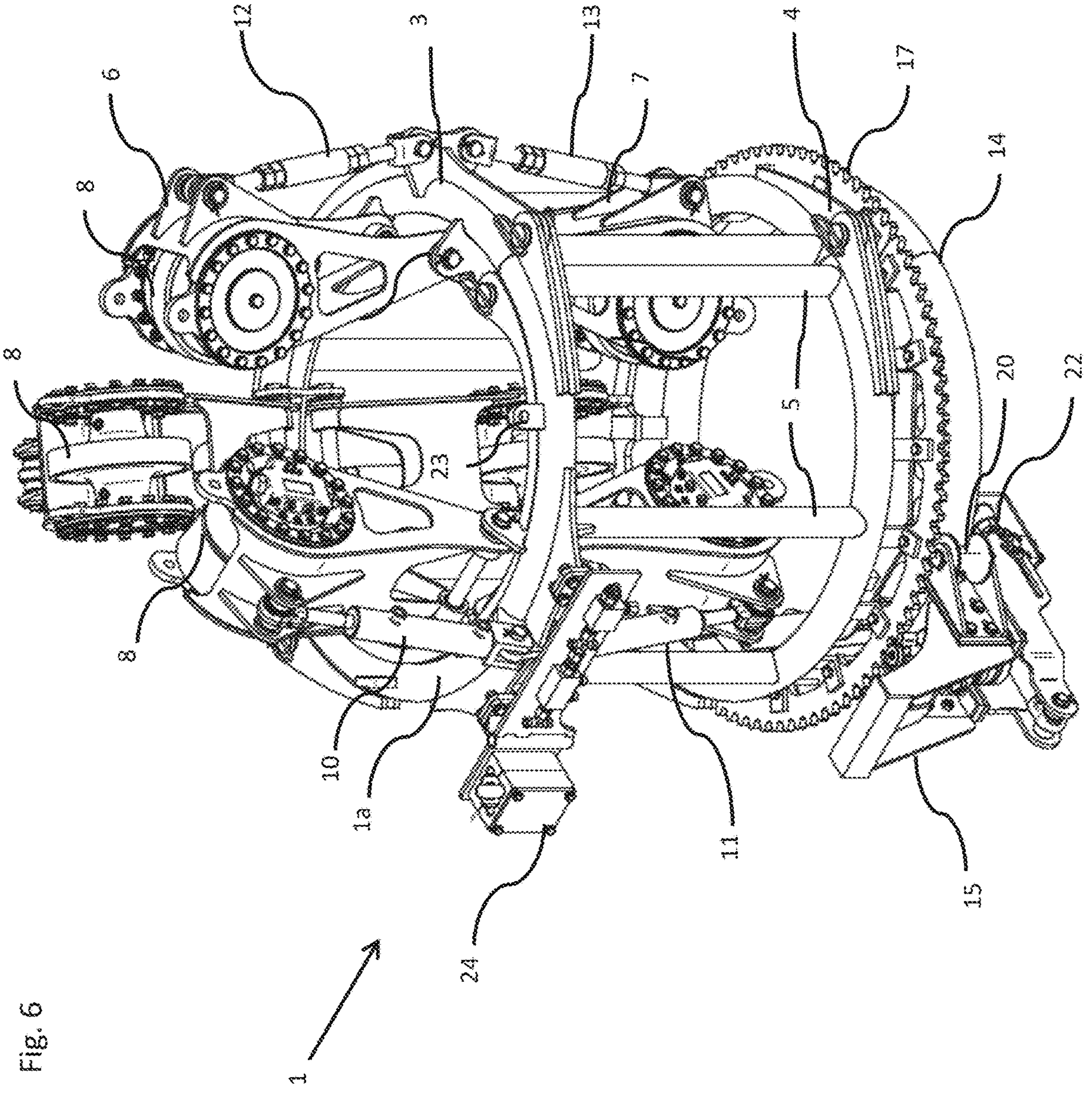
FIG. 6 is a perspective view from above of an apparatus in a second embodiment of the invention.
Figure 7:
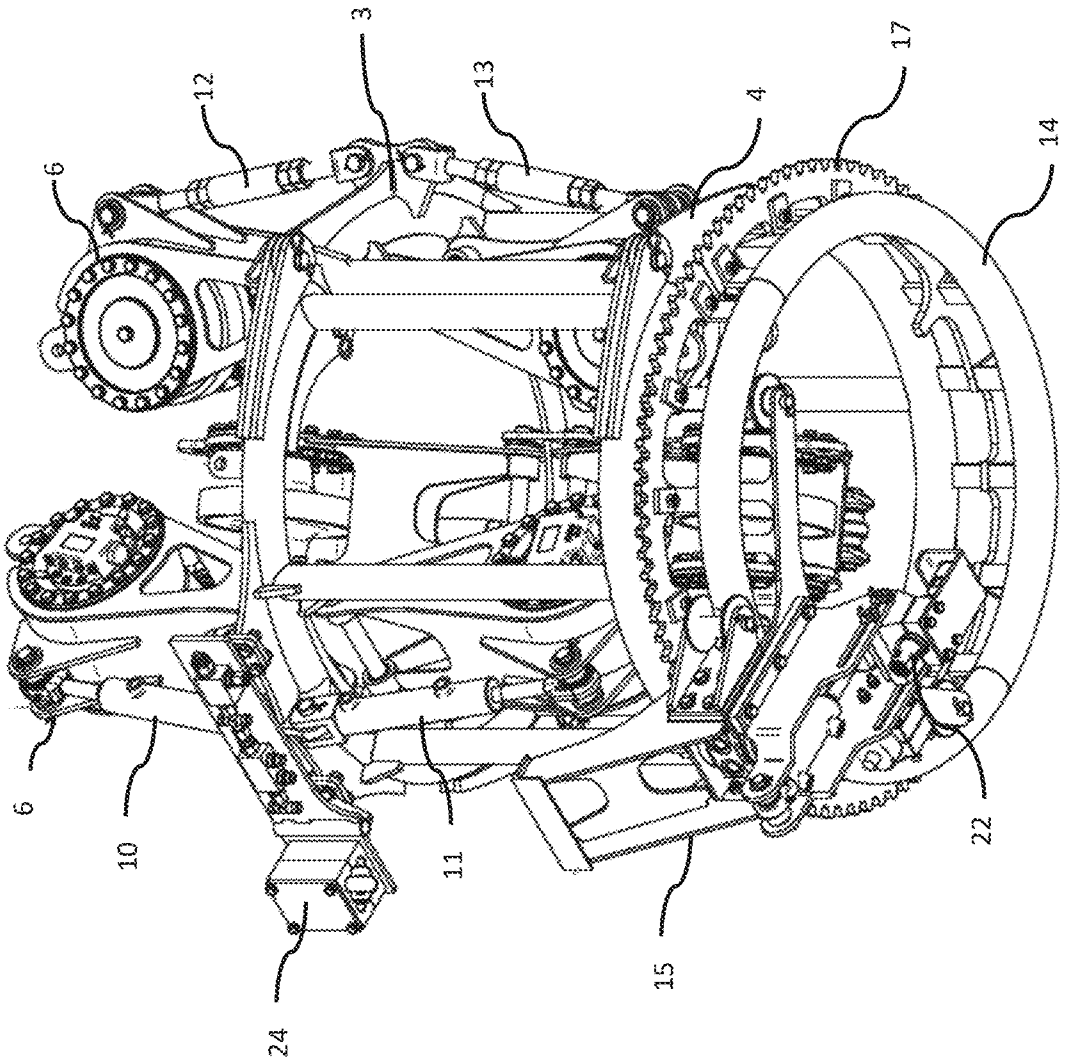
FIG. 7 is a perspective view from below of the apparatus of the second embodiment.
Figure 8:
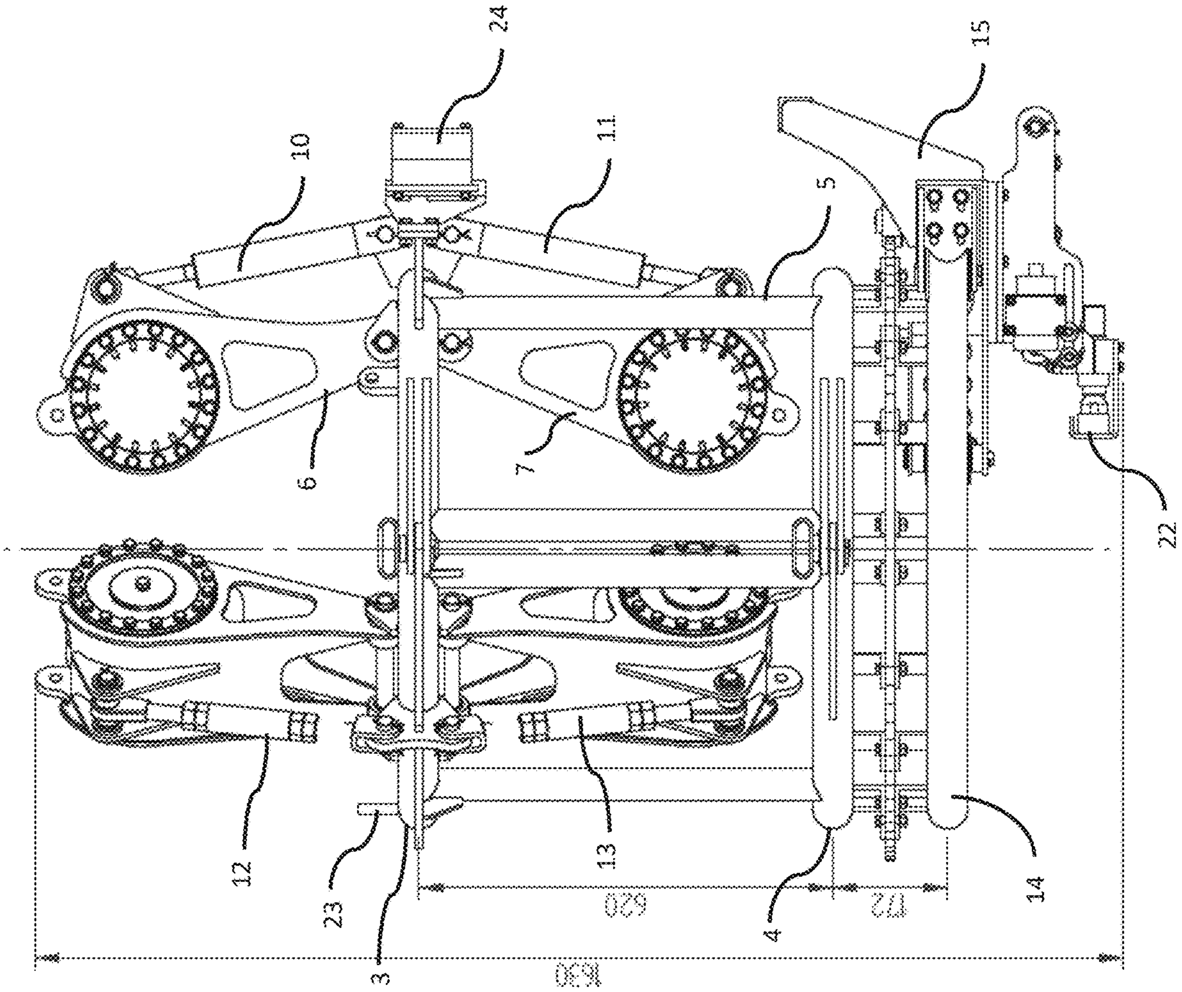
FIG. 8 is a first side elevation of the apparatus of the second embodiment.
Figure 10:
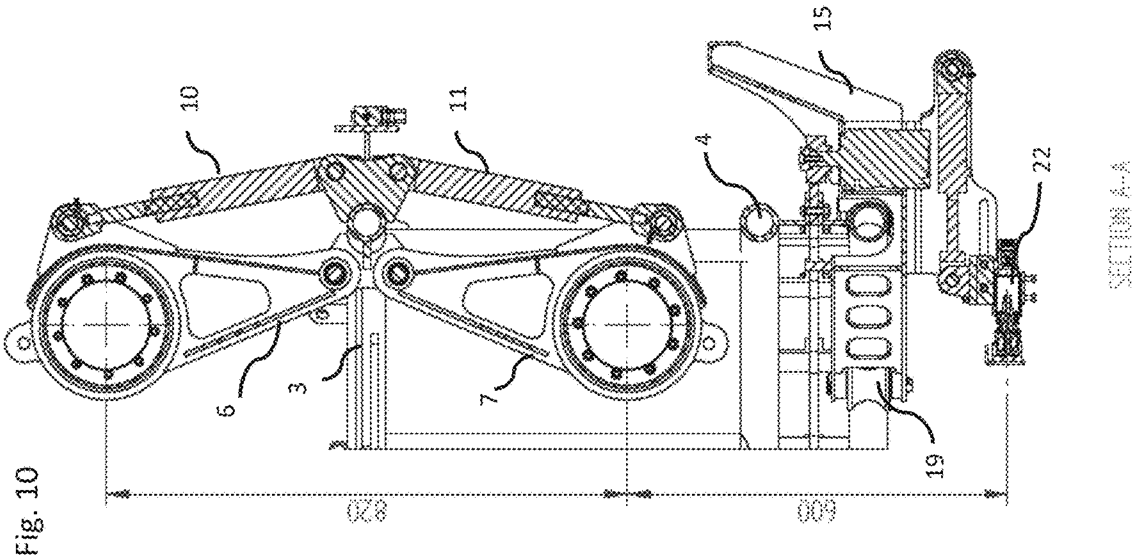
FIG. 10 is a cross-section in the plane A-A in FIG. 9.
Figure 9:
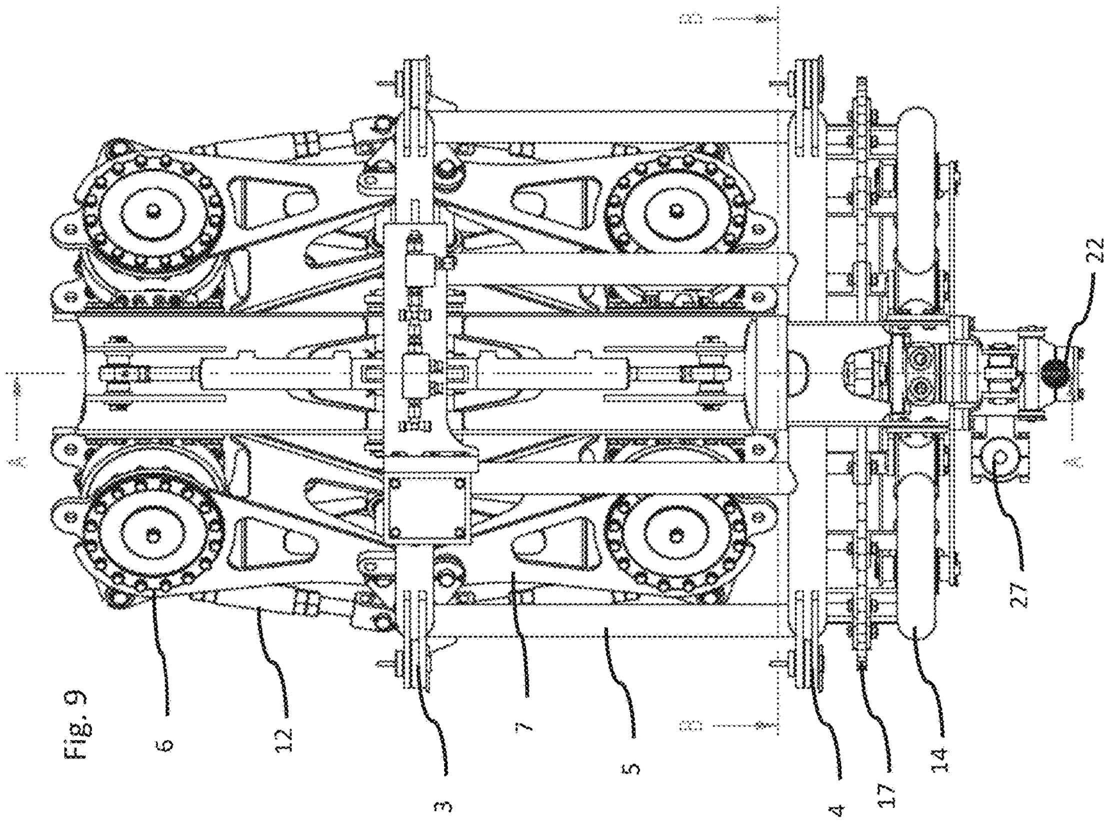
FIG. 9 is a second side elevation of the apparatus of the second embodiment, orthogonal to the first side elevation.
Figure 11:
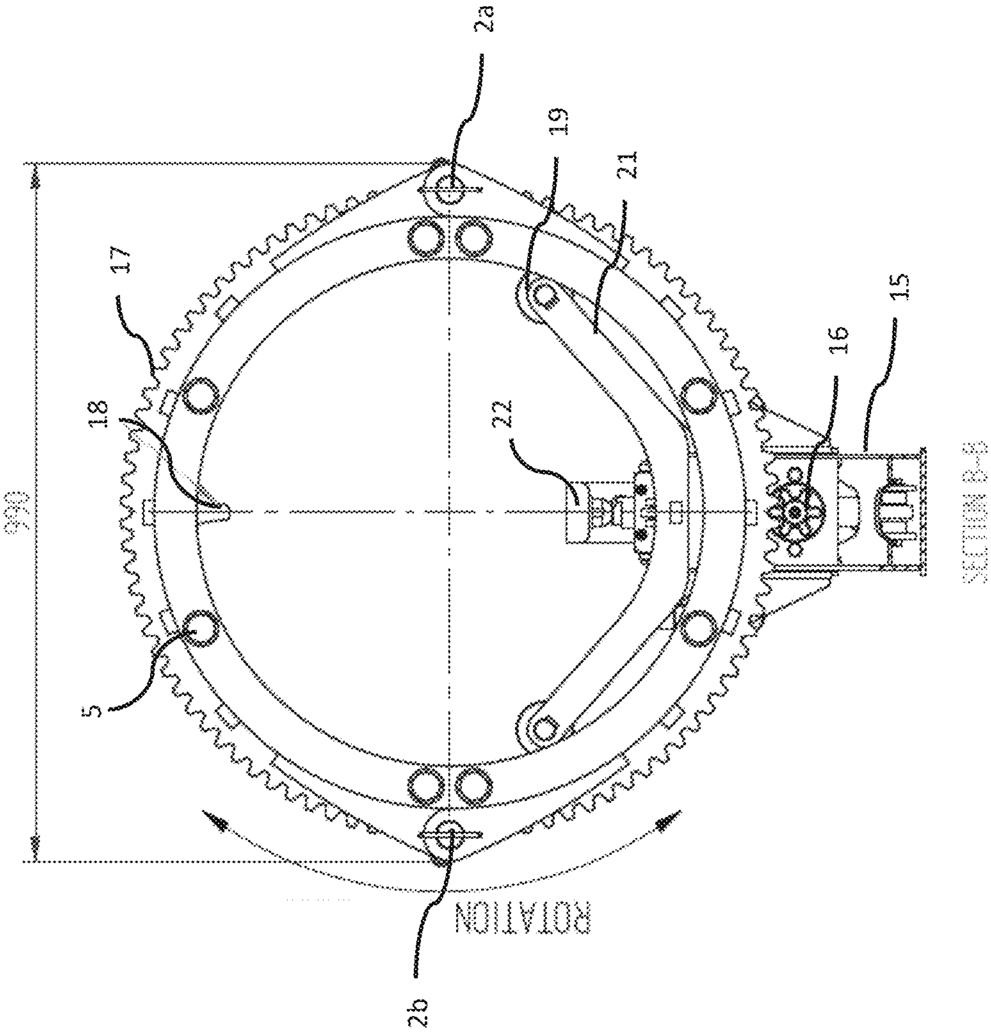
FIG. 11 is a cross-section in the plane B-B in FIG. 9.
Figure 12:
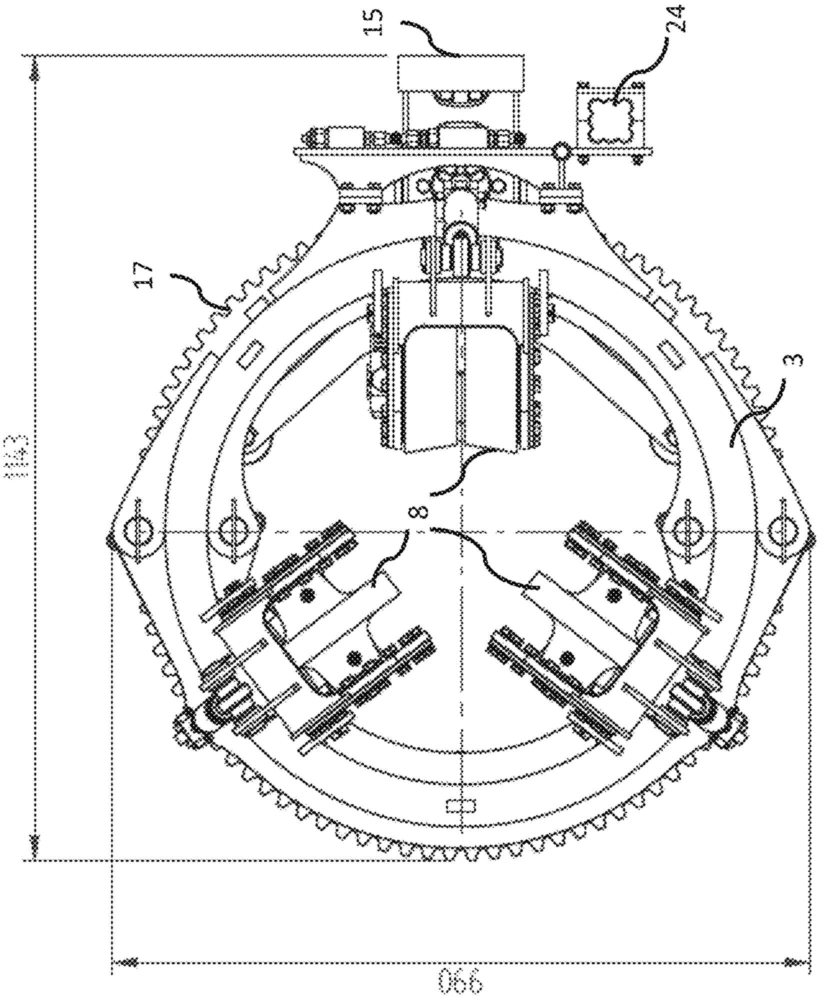
FIG. 12 is a top view of the apparatus of the second embodiment.

The lower support 4 supports a guide rail 14 for guiding a carriage 15 circumferentially around the lower part of the frame 1. The carriage 15 has a drive gear 16 that engages a gear track 17 arranged circumferentially and horizontally around the lower part of the frame 1. The drive gear 16 is driven so that the carriage 15 moves circumferentially around the guide rail 14. The carriage 15 may be driveable circumferentially through approximately 360°, but preferably the movement of the carriage 15 is limited to one complete rotation by a carriage stop 18 provided adjacent the guide rail 14, as shown in FIG. 4.

The carriage 15 preferably does not contact the support structure 30, as accumulation on the support structure 30 could impede the progress of the carriage 15. Instead, the carriage 15 is supported by a pair of inner rollers 19 that contact an inner side of the guide rail 14, and a pair of outer rollers 20 that contact an outer side of the guide rail 14. The inner rollers 19 are mounted on respective carriage arms 21 that extend horizontally to either side of the carriage 15, for improved stability.

In an alternative embodiment, the functions of the guide rail 14 and the gear track 17 may be combined. For example, the gear track 17 and drive gear 16 could be omitted and one or more of the inner or outer rollers 19, 20 may be driven so as the drive the carriage 15 around the guide rail 14. Alternatively, the guide rail 14 may be omitted and the gear track 17 modified so as to provide a guiding function. Instead of a gear/gear track or rack and pinion arrangement, an alternative linear drive arrangement may be used, such as a roller pinion or friction drive.

The carriage 15 is arranged to carry one or more tools 22 for servicing the support structure 30. By moving the frame 1 up and down the support structure 30 using the driveable wheel(s) 8, 9, and moving the carriage 15 circumferentially around the support structure 30, the tool(s) 22 may reach substantially any part of the external surface of the support structure 30, at least within the splash zone and subject to any restrictions due to hydraulic lines and the like.

The tool(s) 22 may be moveably mounted on the carriage 15, to allow movement of the tool(s) 22 relative to the carriage 15. For example, the tool(s) 22 may be reciprocally driveable towards and away from the support structure 30, for example in a radial direction.

Examples of the tool(s) that may be mounted either singly or together on the carriage 15, and which may be interchangeable, include:

- a high-pressure water nozzle for cleaning the surface of the support structure 30
- a wall thickness measuring probe for measuring the wall thickness of the support structure 30, for example using ultrasound
- a video camera 27 for inspection of the servicing site
- a clearance sensor for sensing clearance from the surface of the support structure
- a painting tool, such as a paint roller or brushes, for painting the surface of the support structure 30
- a wrapping tool for applying a protective wrapping to the support structure 30
- a cutting tool for cutting a part of the support structure 30, for example using high-pressure abrasive cutting.

In the second embodiment, the carriage 15 carries a camera 27, such as a video camera, in addition to a cleaning tool 22.

The apparatus may include one or more distance sensors, to determine the distance travelled along the support structure 30. The distance sensor(s) may for example determine the number of rotations of the wheel(s) 8, 9, for example by using one or more optical or magnetic angular position sensors.

The carriage 15 may include one or more rotational position sensors (e.g. optical or magnetic sensors) able to detect an absolute or relative circumferential position of the carriage 15 relative to the frame 1, for example by detecting reference position markings on the guide rail 14 or the gear track 17.

The distance sensor(s) and/or rotational position sensors(s) may be used to determine the position of the tool 22, carriage 15 or another part of the apparatus on the support structure 30. This may allow the apparatus to travel to a predetermined absolute position or to return to a previously visited position, for example where an anomaly or discrepancy has been detected.

The apparatus may be aligned with one or more reference marks on the support structure 30, to allow the apparatus to return to a previously visited position relative to the reference marks. In one example, a horizontal and/or vertical visible mark is made on the support structure 30 corresponding to an initial position of one or more parts of the apparatus, such as the vertical position of the upper support 3 and the circumferential position of a predetermined one of the struts 5, identified for example by a marking such as a distinguishing paint marking. The distance sensor(s) is set to zero. The carriage 15 is to its maximum circumferential position (either clockwise or anti-clockwise), and the rotational position sensor(s) is set to zero. As the apparatus moves along the support structure 30, the distance sensor(s) and rotational position sensor(s) measure the distance travelled in an axial and circumferential direction relate to the initial position. This enables the position of any anomaly or discrepancy on the support structure to be mapped and returned to, if required.

The first embodiment is designed to service support structures 30 with a diameter in the range 22-36 inches (0.56-0.91 metres). Alternative embodiments of different sizes and/or numbers of frame segments 1*a*, 1*b*, 1*c* may be provided to service support structures of other diameters. For example, FIGS. 6 to 12 show a second embodiment which is similar in construction to the first embodiment but has a frame 1 of smaller diameter designed to service a support structure 30 with a diameter in the range 9%-22 inches (0.24-0.56 metres). The frame 1 comprises two frame segments 1*a*, 1*b*, which are semi-cylindrical and are assembled together to form a cylindrical frame 1.

The second embodiment has three pairs of upper and lower arms 6, 7 as in the first embodiment, evenly spaced around the upper support 3. In other embodiments, particularly those designed for servicing support structures of larger diameter, there may be more than three pairs of arms 6, 7.

The arms 6, 7, together with the wheels 8, 9, hydraulic cylinders 10, 11 and adjustable length bars 12, 13, may be removably attached to the frame segments 1*a*, 1*b*, 1*c*. These components may then be interchangeably used with the frame segments 1*a*, 1*b*, 1*c* of the first embodiment and the frame segments 1*a*, 1*b* of the second embodiment. Different carriages 15 may be required for the first and second embodiments, due to the different radius of curvature. Alternatively, a single adjustable carriage 15 may be interchangeably used between the first and second embodiments, for example with adjustable carriage arms 21.

FIGS. 17 to 22 show an apparatus in a third embodiment, which differs from the first and second embodiments in that the cage or frame 1 includes a middle support 33 to which two pairs of upper and lower arms 6, 7, carrying corresponding wheels 8, 9, are connected. Hence, the cage 1 comprises three annular horizontal pieces (lower support 3, middle support 33 and upper support 4) connected together by vertically extending struts 5 to form a generally cylindrical structure. Hence, the third embodiment can be thought of as a development of the first and second embodiments in which the middle support 33 performs a similar function to the upper support 4 of the first and second embodiments, and the upper support 4 of the third embodiment is an additional structural part that extends beyond the upper arms 6.

The cage 1 comprises two semi-cylindrical sections 1*a*, 1*b* hingedly connected together at connection points 2*a*, 2*b*, and lockable together, similarly to the second embodiment. The cage in this example may designed in a larger version for fitting around structures 30 with a diameter of between 22 and 36 inches (0.56-0.91 m), or in a smaller version for structures 30 with a diameter of between 8 and 22 inches (0.20-0.56 m).

One pair of arms 6, 7 has a corresponding pair of actuating cylinders 10, 11, while the other pair of arms has a corresponding pair of adjustable length bars 12, 13. The wheels 8, 9 of at least one pair of arms 6, 7 are reciprocally drivable to as to move the apparatus up and down the structure 30.

Figure 18:
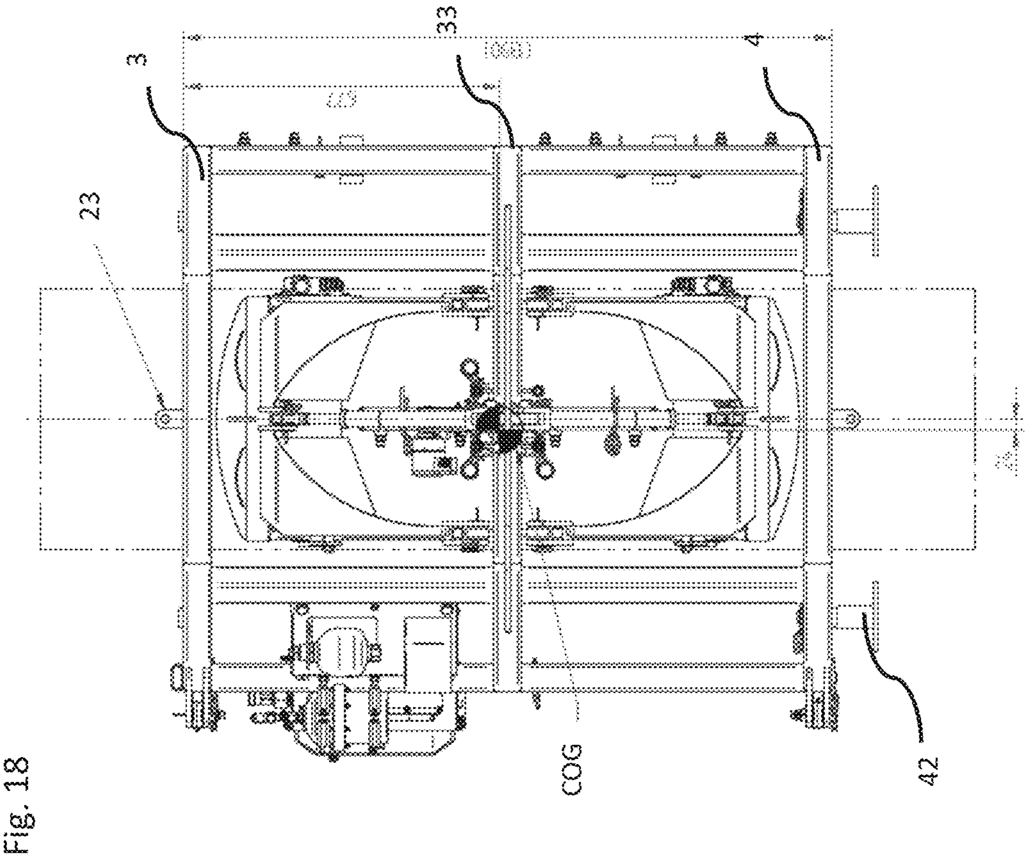
FIG. 18 is a second side elevation of the apparatus of the third embodiment, orthogonal to the first side elevation.
Figure 17:
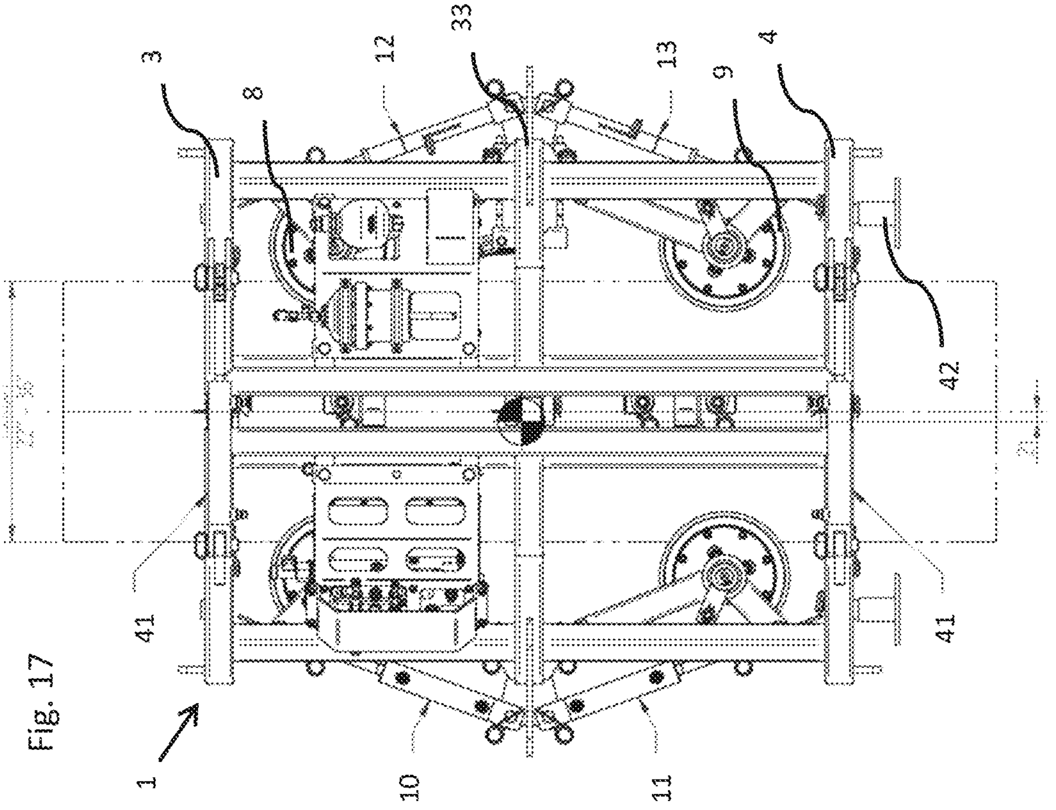
FIG. 17 is a first side elevation of an apparatus in a third embodiment of the invention.
Figure 20:
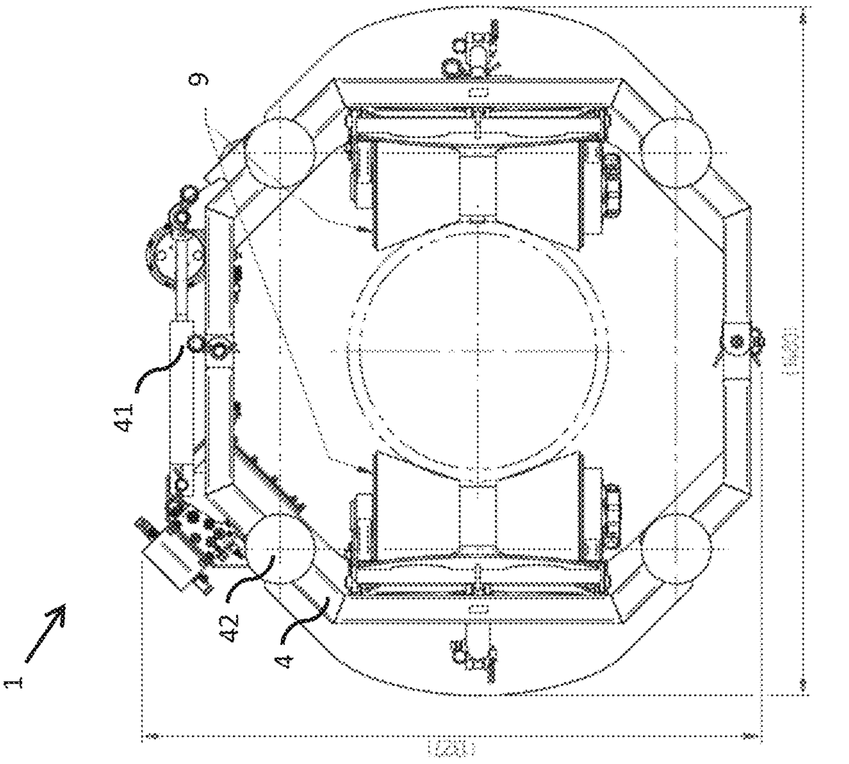
FIG. 20 is a bottom view of the apparatus of the third embodiment.
Figure 19:
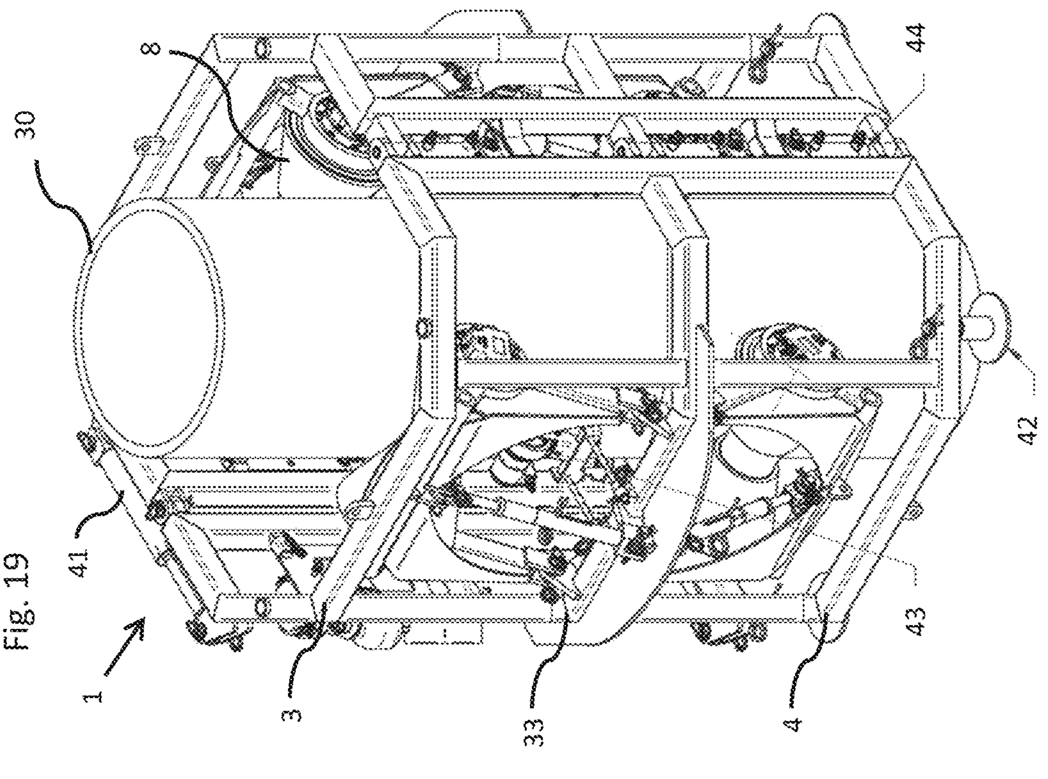
FIG. 19 is a perspective view from above of the apparatus of the third embodiment.
Figure 22:
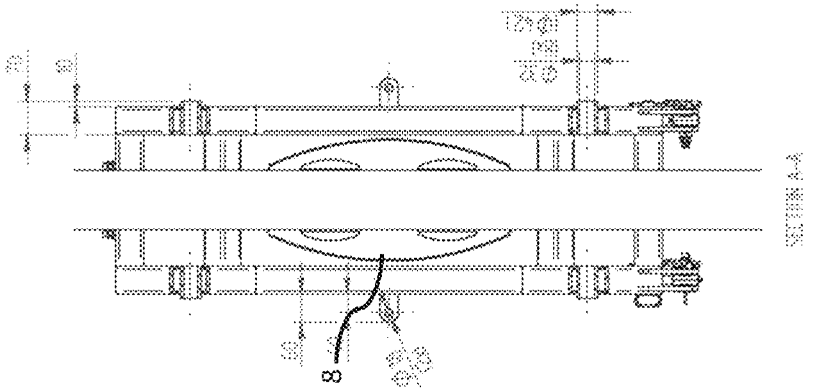
FIG. 22 is a partial cross-sectional view in the plane A-A of FIG. 21.
Figure 21:
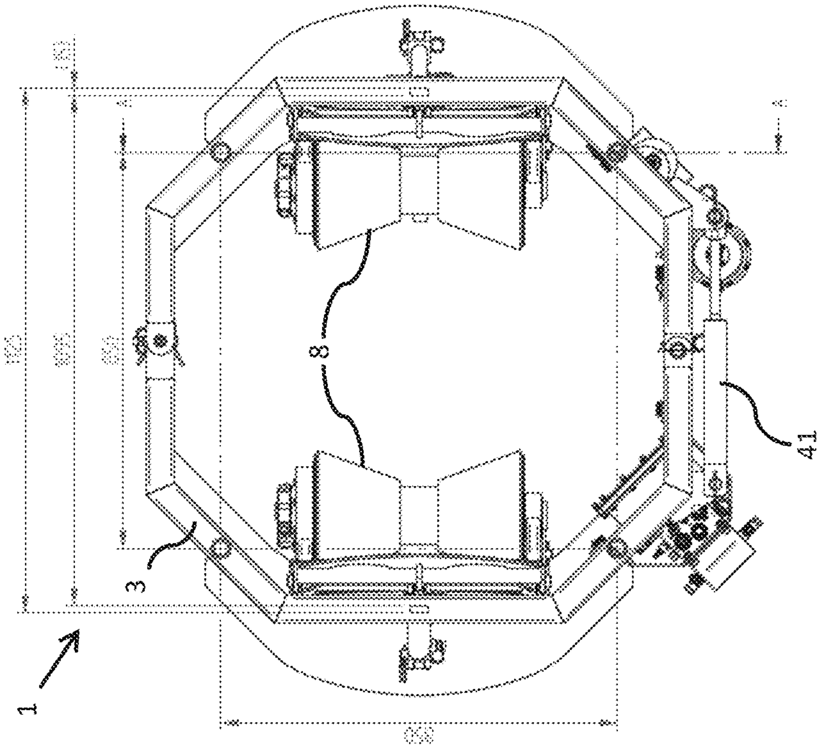
FIG. 21 is a top view of the apparatus of the third embodiment.
Figure 23:
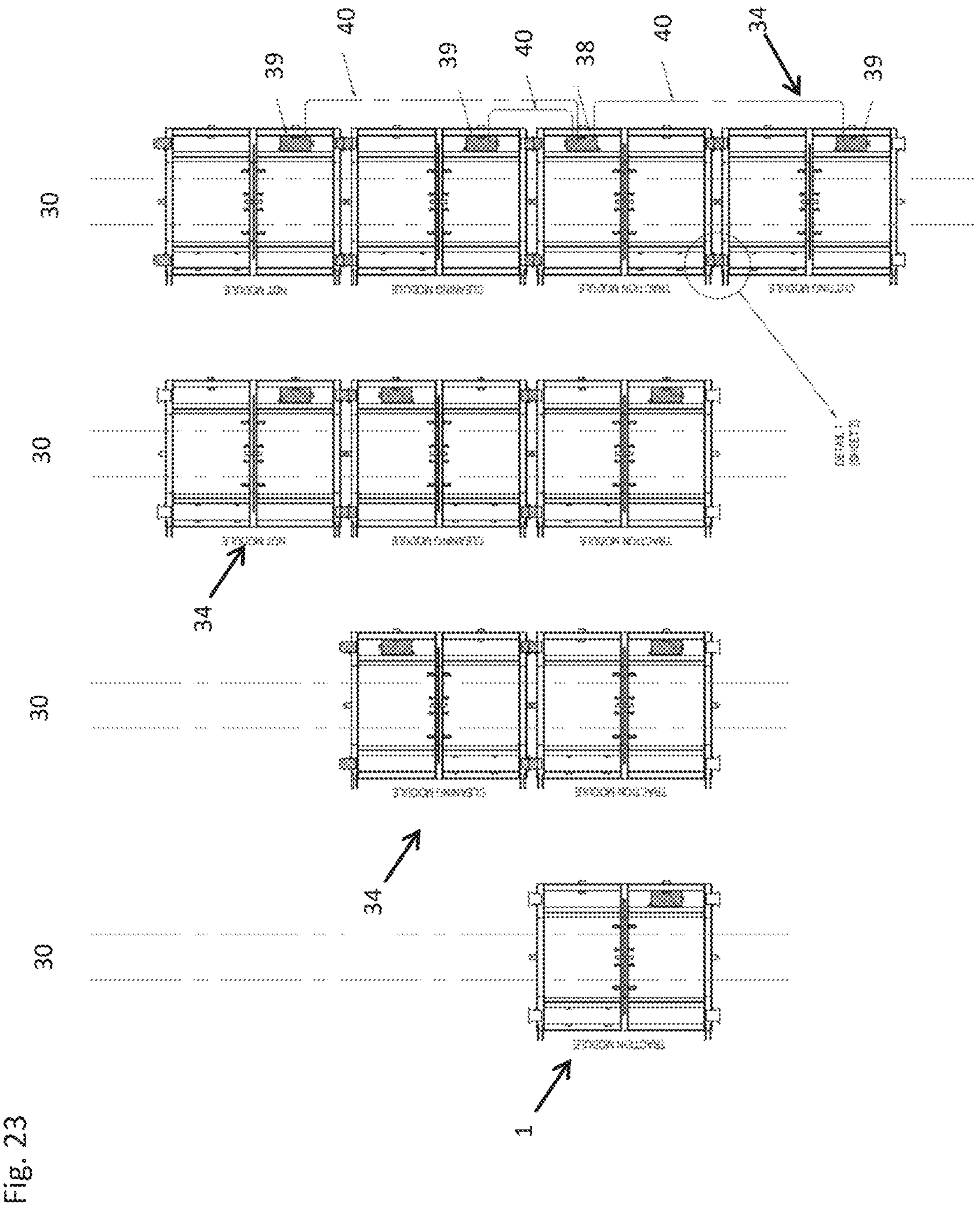
FIG. 23 is a diagram showing different configurations of the apparatus of the third embodiment as a traction module, with additional modules.
Figure 24:
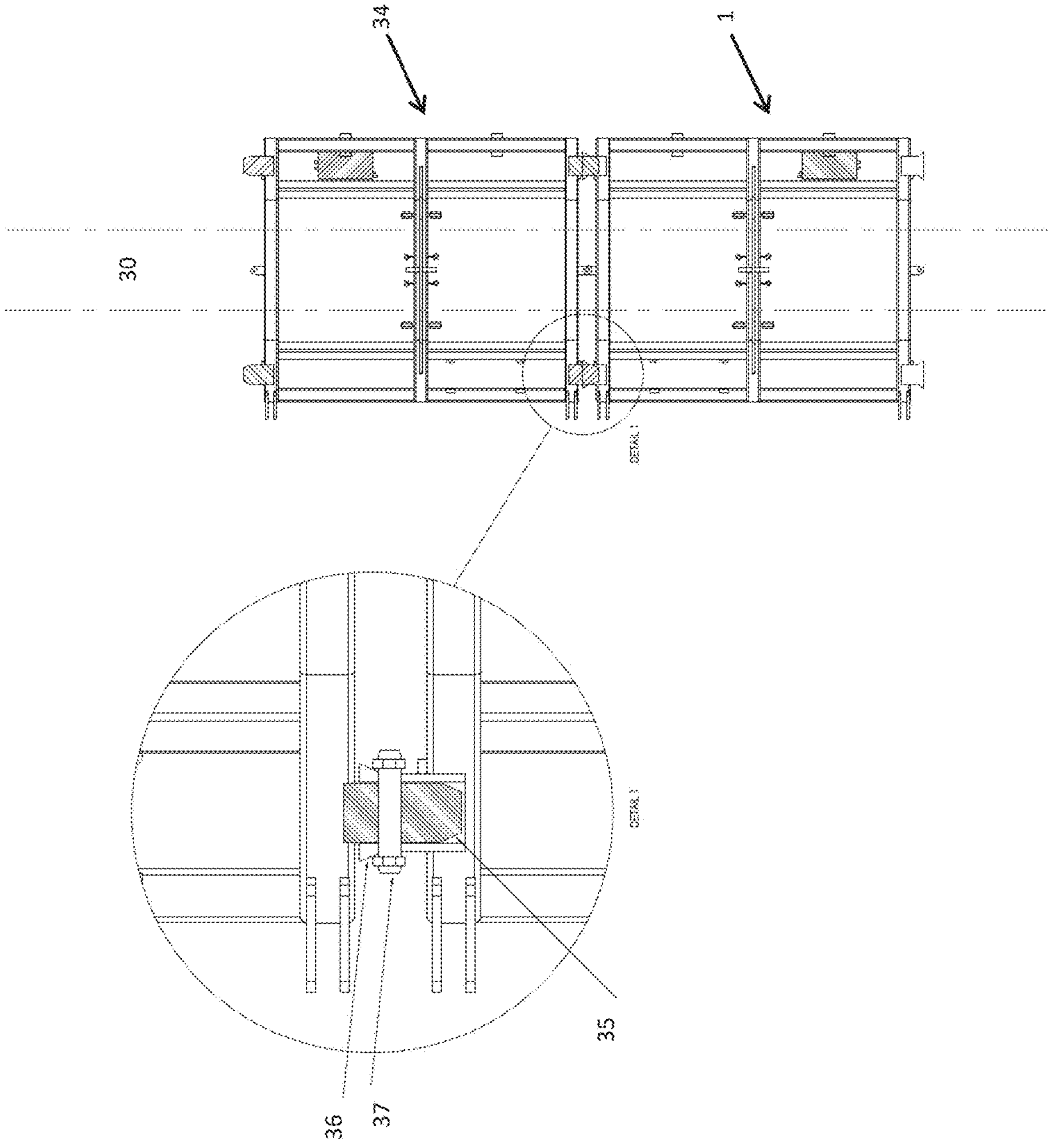
FIG. 24 shows a detailed view of a connection system between modules in the configurations of FIG. 23.

In this embodiment, the apparatus has no guide rail 14 or carriage 15 for carrying tools 22. Hence, the centre of gravity (COG) is close to the geometric centre of the cage 1, as shown in FIGS. 17 and 18. As shown in FIGS. 23 and 24, the apparatus is configured as a traction module for connection in series along and around the structure 30 to one or more servicing modules 34, such as a cleaning module, NDT (non-destructive testing) module and/or cutting module. Each additional module comprises a cage or frame of similar construction to that of the traction module, and may comprise two or more pairs of arms 6, 7 with corresponding wheels 8, 9 similar to that of the traction module, except that none of the wheels 8, 9 of the additional module are driveable; instead the servicing modules 34 are driven along the structure 30 by the traction module. Alternatively, the one or more servicing modules may be moved along the structure 30 by some other means, such as one or more winches attached to the structure 30 or to a platform.

The distance travelled along the structure 30 may be measured by a measuring wheel 43 that is supported by the frame 1, for example by middle support 33, and is pivotable into contact with the structure 30. The measuring wheel may be an encoding wheel from which the distance travelled may be detected optically and/or electronically.

As shown in FIG. 24, adjacent first and second modules may be connected together by one or more first docking parts on a first module that docks with a corresponding one or more second docking parts of the second module; for example, the first docking part(s) may comprise one or more male docking probes 35 and the second docking part(s) may comprise one or more receptacle(s) 36 into which the corresponding male docking probe(s) 35 fit. The connection may be secured by a locking system such as a quick release bolt 37 that passes through apertures in the male docking probe and the receptacle. Alternative docking and/or securing mechanisms may be used.

The traction module may have a plurality of feet 42 attached to the lower support 4. Preferably, the feet 42 are removable to allow connection of an additional module below the traction module.

The traction module includes a master controller 38 that is removably connectible by leads 40 to one or more corresponding slave controllers 39 on the one or more additional modules. The master controller 38 is controlled from the surface by the remote control unit 25, and passes communication signals and/or electrical power to the slave controllers 39.

Figure 13:
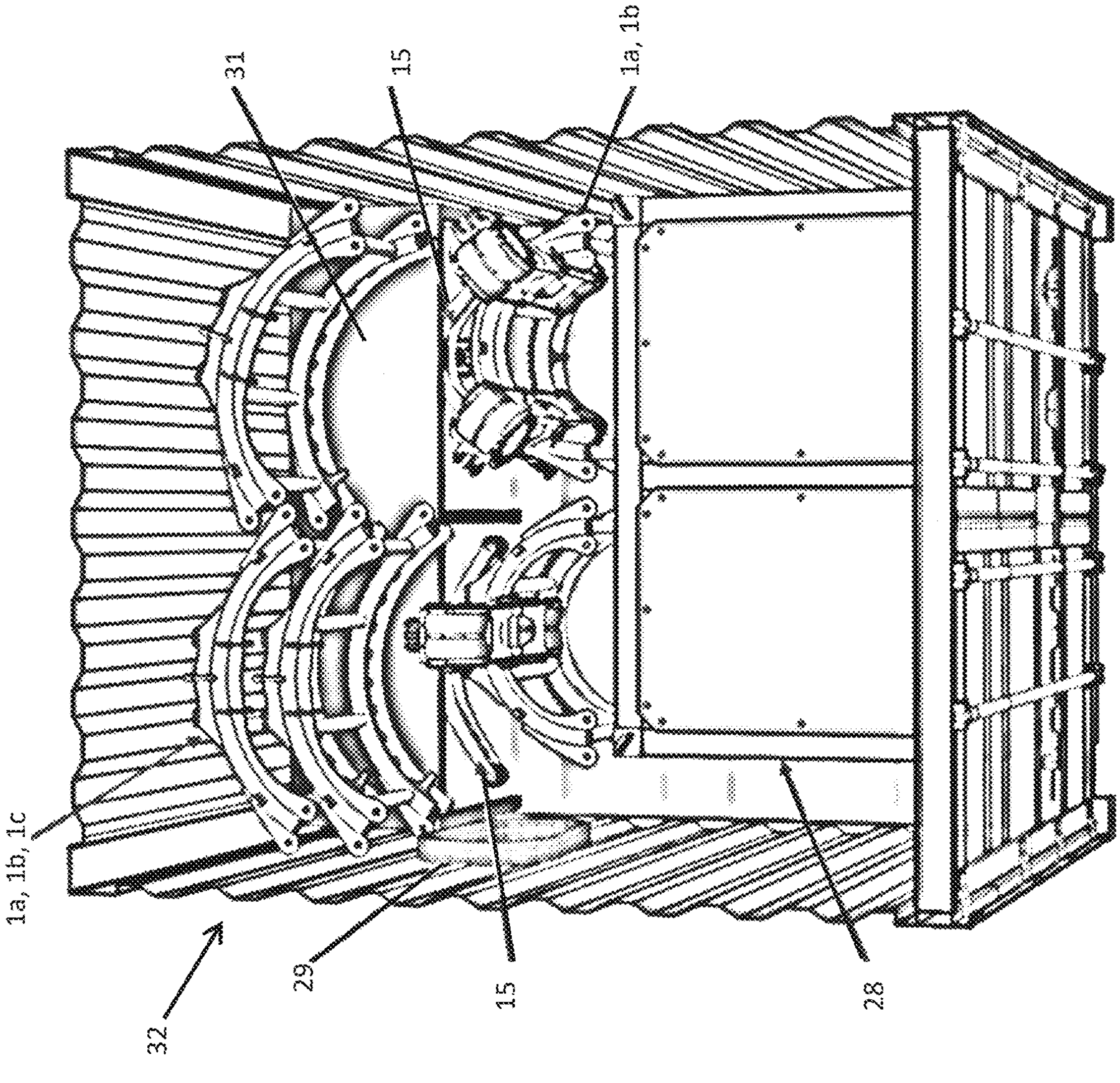
FIG. 13 is a view of a kit of parts for assembly to form apparatus according to the first or second embodiments.

FIG. 13 shows a kit of parts that may be provided to allow apparatus of either the first or second embodiment to be assembled, comprising at least the frame segments 1*a*, 1*b*, 1*c* of the first embodiment, the frame segments 1*a*, 1*b* of the second embodiment, the arms 6, 7, together with the wheels 8, 9, hydraulic cylinders 10, 11 and adjustable length bars 12, 13 (shown here attached to the frame segments 1*a*, 1*b* of the second embodiment), carriages 15 for the first and second embodiments, a set of hydraulic hoses 29, and a hydraulic power supply 28. In this example, the kit of parts is provided in a transportable container 32 including a workbench 31, to facilitate partial assembly of the apparatus before assembly around the support structure 30.

In embodiments designed for support structures 30 of only one diameter, or a small range of diameters, some of the non-driven pairs of arms 6, 7 and wheels 8, 9 may be replaced by other types of guides, such as rollers or wheels of fixed radial position.

Figure 14:
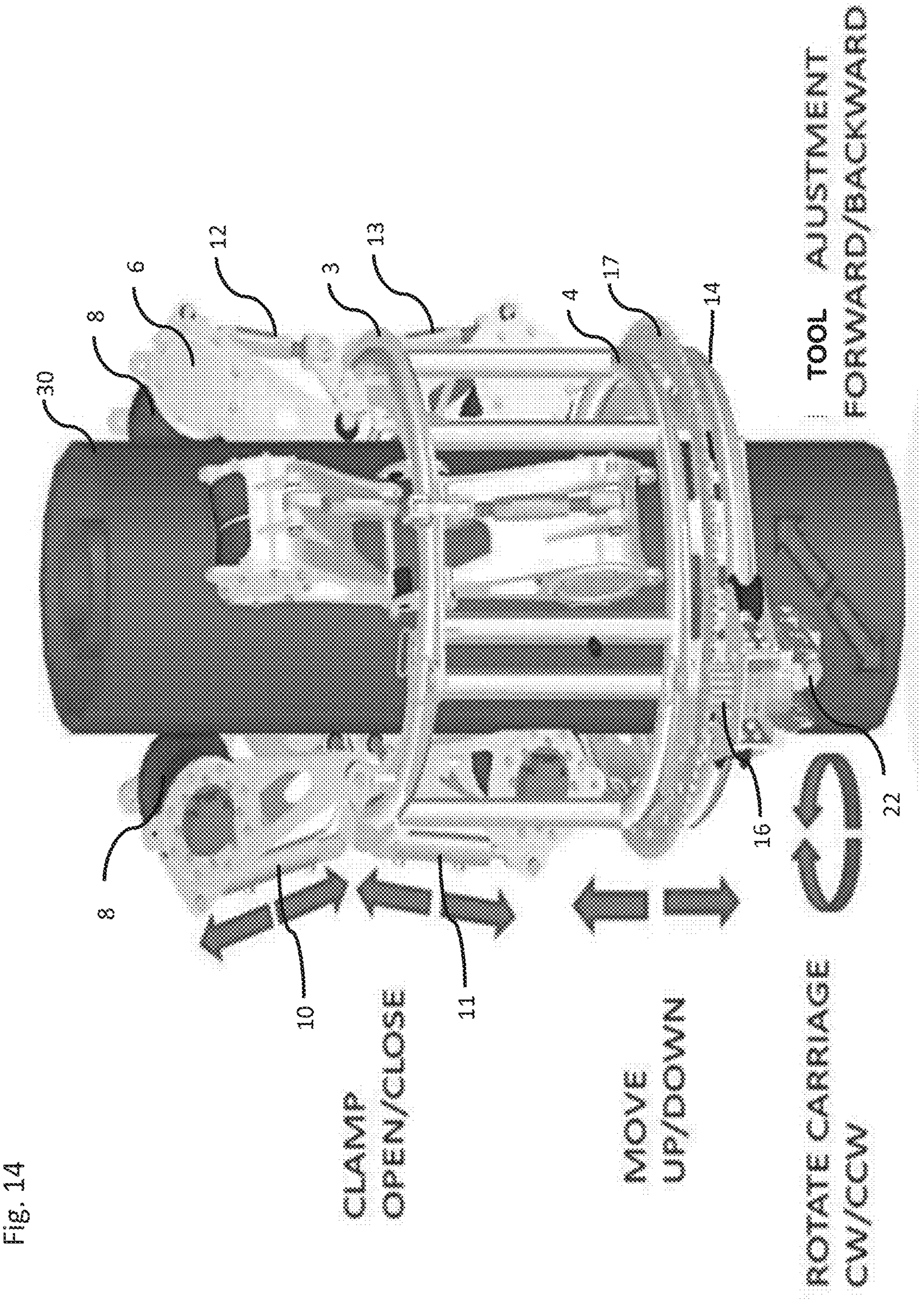
FIG. 14 is a diagram of the operations of an apparatus in embodiments of the invention.

FIG. 14 shows examples of driveable functions of the apparatus in embodiments of the invention, such as the embodiments as described above:

i. Clamp open/close, by driving the driveable pivotable upper and lower arms 6, 7 so as to pivot radially outwards/inwards respectively;

ii. Move up/down, by driving the driveable wheel(s) 8, 9 in contact with the surface of the support structure 30 in forward/reverse directions respectively;

iii. Rotate carriage clockwise/anticlockwise, by driving the drive gear 16 in forward/reverse direction respectively;

iv. Tool adjustment forward/backward, by driving the tool 22 radially forward/backward respectively, with respect to the carriage 15.

The driveable functions may be each be powered and/or controlled by hydraulic or electric power, for example by hydraulic hoses and/or electrical cables connected to the apparatus. Hydraulic power is preferable for at least some applications, for example in order to reduce the weight of the apparatus and/or to avoid the use of electricity in a marine environment. A hydraulic power unit may be mounted on a platform and connected to the apparatus by flexible hydraulic hoses.

Figure 15:
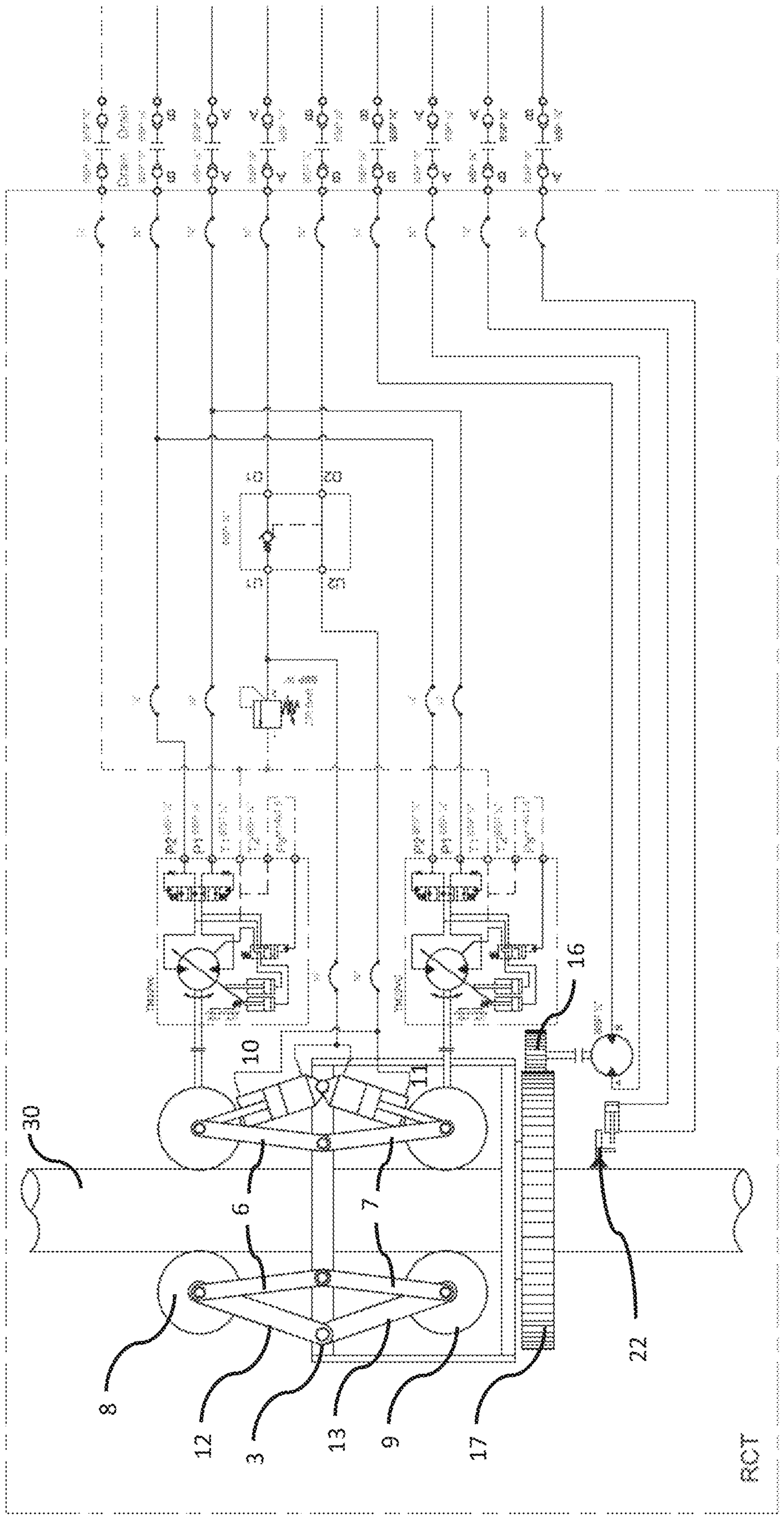
FIG. 15 is a diagram of part of a hydraulic system of an apparatus in embodiments of the invention.

An example of a hydraulic drive system for the apparatus is shown in FIG. 15, in which the pivoting of one of the pairs of arms 6, 7, the rotation of the corresponding wheels 8, 9, and in the case of the first and second embodiments, the rotation of the drive gear 16, and the reciprocal driving of the tool 22 are driven by separate hydraulic lines, connected to a hydraulic power unit (not shown).

Figure 16:
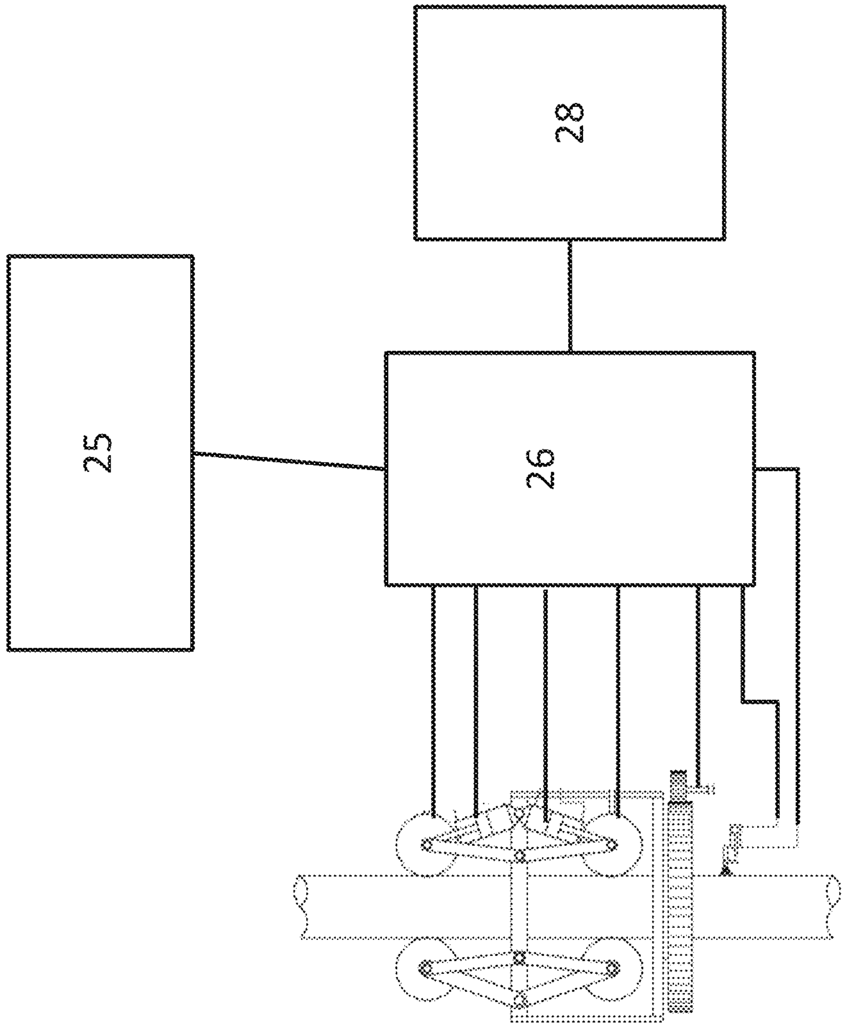
FIG. 16 is a diagram illustrating a remote control system for operating an apparatus in embodiments of the invention.

The apparatus is preferably controlled by a remote control unit 25, as shown for example in FIG. 16, which allows control of some or all of the functions described above, preferably by means of corresponding user actuable controls. The remote control unit 25 may be connected by a wired or wireless connection to a controller 26 of the functions described above. Power for driving the functions may be provided by a power supply 28, under the control of the controller 26.

Preferably, the drive speeds of the wheels 8, 9 and of the drive gear 16 are controllable independently to adjust for the servicing required. Alternatively or additionally, the remote control unit 25 or controller 26 may be programmable or programmed to carry out a particular service by coordinated control of the different functions, optionally in response to the distance travelled as detected by the distance sensor(s), and/or the circumferential position of the carriage 15 as detected by the circumferential position sensor(s). This may enable a predetermined section of the support structure 30 to be serviced.

The pivot angle of the arms 6, 7 may be varied during use, for example to allow the apparatus to be driven up or down a sloping or curved support member.

The number of wheels 8, 9 that are powered may be varied according to the load to be carried by the apparatus or the operating conditions of the apparatus. The pivoting of more than one of the pairs of arms 6, 7 may be powered, depending on the adjustability or clamping force required.

Embodiments of the present invention may be used for servicing tapering support structures, by varying the degree of pivoting of the arms 6, 7 to adjust for varying diameter as the apparatus moves up and down the support structure.

In an alternative embodiment, the arms 6, 7 may be mounted on the lower support 4 and the guide rail 14 may be mounted on the upper support 3.

Preferably, the frame segments 1*a*, 1*b*, 1*c* are constructed of aluminium tube so as to be lightweight. For example, the mass of the apparatus, excluding hydraulic or electrical lines, may be in the range 200-300 kg.

For larger embodiments, the method of closure by removable pins may be replaced by a hydraulic closure method, in which two or more of the cage or frame segments 1*a*, 1*b*, 1*c* are connected together with hinged connections, actuated for example by hydraulic rams or cylinders 41, as shown for example in FIG. 17. The segments 1*a*, 1*b*, 1*c* may be connected together on a suitable surface such as a floating pontoon or barge, supported for example by the feet 42. The hinged connections may be opened such that the cage or frame 1 fits around the support structure 30 to be serviced, then closed so as to secure the frame 1 around the structure 30. The segments 1*a*, 1*b*, 1*c* may be secured together by one or more locking mechanisms, such as locking cylinders 44.

The above embodiments are designed for servicing a circular cylindrical support structure 30 such as a pile, and therefore the frame 1 is approximately circular cylindrical, having an inner diameter slightly larger than the diameter of the support structure 30. Alternative embodiments may have alternative shapes and sizes to match the type of support structure 30 which they are designed to service. For example, a square or rectangular cylindrical frame 1, preferably with a pair of arms 5, 6 on each of the four sides, may be used in an embodiment designed for servicing a square or rectangular cylindrical support structure 30.

The above embodiments may be used in a marine or aquatic splash zone, or at a shallow depth below the surface, such as 10 metres. The embodiments may be modified for operation below 10 metres in depth, for example by the use of suitable hydraulic seals. The embodiments may be used for servicing pipes, to the extent that they are not impeded by the support of the pipes.

Alternative embodiments of the present invention may be used for servicing non-marine or on-shore support structures, such as wind turbines or radio masts. For these applications, the frame segments 1*a*, 1*b*, 1*c* may be provided with one or more detachable or permanently attached wheels for or other transport members, allowing the frame segments to be moved into position around the support structure, along the ground. For example, each frame segment 1*a*, 1*b*, 1*c* may have one or more wheels attached at each side and an additional removable wheel on a truss at the apex of a triangle formed by two wheels on the frame 1 and on the outside of the frame. The segments 1*a*, 1*b*, 1*c* may then be assembled or closed around the support structure 20, for example by means of removable pins or by the hydraulic rams as described above.

Figure 25:
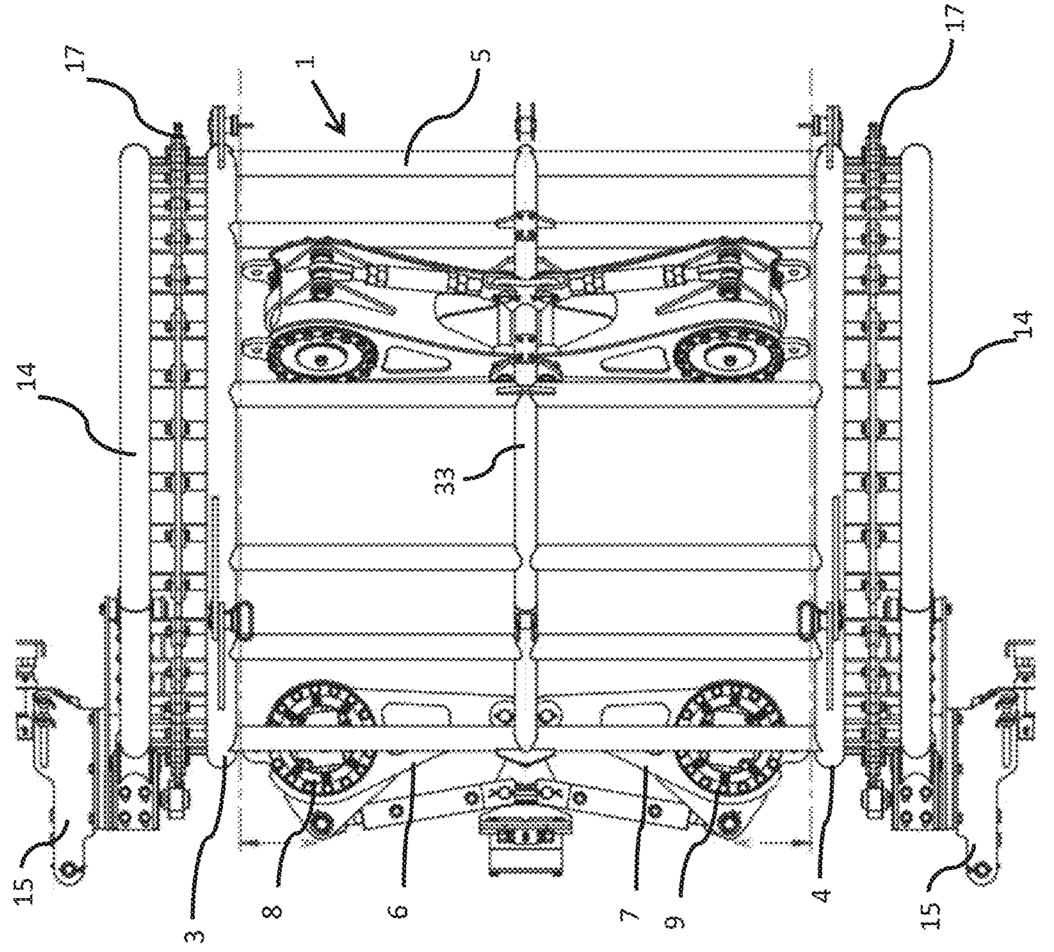
FIG. 25 is a side elevation of an apparatus in a fourth embodiment of the invention.

FIG. 25 shows apparatus in a fourth embodiment of the invention. This embodiment has a frame 1 with upper and lower supports 3, 4 and a middle support 33 on which upper and lower arms 6, 7 carrying respective wheels 8, 9 as in the third embodiment. The upper and lower arms 6, 7 are positioned between adjacent struts 5 and pass between the struts 5 so that the wheels 8, 9 can contact the structure.

As in the third embodiment, the mounting of the upper and lower arms 6, 7 on the middle support leaves the upper and lower supports 3, 4 clear. This enables a guide rail 14 and gear track 17 carrying a tool carriage 15, similar to those of the first and second embodiments, to be mounted on each of the upper and lower supports 3, 4. This arrangement increases the capacity of the apparatus to carry tools on a single module.

The apparatus of the fourth embodiment is particularly suitable for servicing the towers of wind turbines. The positions of the upper and lower arms 6, 7 may be controlled independently to accommodate a tapered tower.

Alternative embodiments of the invention, which may be apparent to the skilled person on reading the above description, may fall within the scope of the invention as defined by the accompanying claims.

LIST OF PARTS AND CORRESPONDING REFERENCE NUMERALS

| Part | Reference |
|---|---|
| Cage or frame | 1 |
| Cage or frame segment | 1a, 1b, 1c |
| Frame connection point | 2a, 2b, 2c |
| Upper support | 3 |
| Lower support | 4 |
| Strut | 5 |
| Upper arm | 6 |
| Lower arm | 7 |

-continued

| Part | Reference |
|---|---|
| Upper wheel/rotating member | 8 |
| Lower wheel/rotating member | 9 |
| Upper hydraulic cylinder | 10 |
| Lower hydraulic cylinder | 11 |
| Upper adjustable length bar | 12 |
| Lower adjustable length bar | 13 |
| Guide rail | 14 |
| Carriage | 15 |
| Drive gear | 16 |
| Gear track | 17 |
| Carriage stop | 18 |
| Inner roller | 19 |
| Outer roller | 20 |
| Carriage arm | 21 |
| Tool | 22 |
| Lifting point | 23 |
| Hose clamp | 24 |
| Remote control unit | 25 |
| Controller | 26 |
| Camera | 27 |
| Power supply | 28 |
| Hydraulic hose | 29 |
| Structure | 30 |
| Workbench | 31 |
| Container | 32 |
| Middle support | 33 |
| Additional module(s) | 34 |
| Male docking probe | 35 |
| Receptacle | 36 |
| Quick release bolt | 37 |
| Master controller | 38 |
| Slave controller | 39 |
| Lead | 40 |
| Hydraulic closing ram or cylinder | 41 |
| Foot | 42 |
| Measuring wheel | 43 |
| Locking cylinder | 44 |

What is claimed is:

1. An apparatus for servicing a structure, comprising:

a frame for assembly or arrangement around the structure, the frame including upper and lower supports provided at axial ends of the frame and a middle support provided between said opposite ends of the frame, said upper, middle and lower supports connected together by a plurality of vertically extending struts to form a generally cylindrical frame;

a plurality of pairs of first and second arms pivotally attached at proximal ends thereof to the middle support; and a plurality of pairs of first and second rotating members, attached to distal ends of the respective first and second arms, for contact with the structure;

the first and second arms extending in axially opposite directions and being pivotable so as to move the corresponding first and second rotating members towards or away from the structure;

wherein at least one of the first and second arms is arranged to move and pass between a pair of adjacent ones of the plurality of vertically extending struts such that the corresponding first or second rotating member is able to contact the structure;

wherein the first and/or second arms are drivable so as to pivot towards and away from the structure and bring the respective rotating member respectively into and out of contact with the structure;

wherein each of the rotating members that contact the structure is arranged on a respective one of said plurality of pivotable arms; and wherein the upper support extends beyond the first arm such that the corresponding first rotating member contacts the structure at a position between the upper support and middle support; and wherein the plurality of said pairs of first and second arms and first and second rotating members are circumferentially spaced around the middle support.

2. The apparatus of claim 1, including hydraulic cylinders for driving the first and/or second arms.

3. The apparatus of claim 1, wherein the frame comprises a plurality of frame segments arranged to be assembled around the structure.

4. The apparatus of claim 3, wherein an adjacent pair of the frame segments are hingedly connected together.

5. The apparatus of claim 1, including one or more connectors for removably connecting the apparatus to one or more modules for servicing the structure.

6. The apparatus of claim 5, including said one or more modules, the or each said module comprising:

a module frame for assembly or arrangement around the structure, the module frame including at least one support.

7. The apparatus of claim 6, wherein the or each said module includes a slave controller connected or connectable to a master controller.

8. The apparatus of claim 1, including one or more carriages arranged for circumferential movement at or near either or both axial ends of the frame, the carriage carrying, or being arranged to carry, one or more tools for servicing the structure.

9. The apparatus of claim 8, wherein the carriage is drivable circumferentially relative to the frame.

10. The apparatus of claim 9, including a track arranged circumferentially around the frame, the carriage having a drive member that engages the track and is drivable so as to move the carriage around the track.

11. The apparatus of claim 8, including a guide rail for guiding the carriage circumferentially, the guide rail being attached to the upper or lower support.

12. The apparatus of claim 8, wherein the tool is drivable relative to the carriage.

13. The apparatus of claim 1, wherein the structure is a tapered structure and the arrangement of rotating members that contact the tapered structure on a respective one of said plurality of pivotable arms facilitates servicing of the tapered structure.

14. An apparatus for servicing a structure, comprising:

a frame for assembly or arrangement around the structure, the frame including first and second supports at axially opposite ends thereof, said first and second supports connected together by a plurality of vertically extending struts to form a generally cylindrical frame;

a plurality of pivotable arms including at least one pair of first and second arms pivotally attached at proximal ends thereof to the first support;

at least one pair of first and second rotating members, attached to distal ends of the respective first and second arms, for contact with the structure, wherein the second arm is arranged to move and pass between a pair of adjacent ones of the plurality of vertically extending struts and also move and pass between the first and second supports such that the corresponding second rotating member is able to contact the structure;

the first and second arms extending in axially opposite directions and being pivotable so as simultaneously to move the corresponding first and second rotating members towards or away from the structure; and a carriage arranged for circumferential movement wherein the carriage is mounted at or near the second support and is not mounted at or near the first support, the carriage carrying, or being arranged to carry, one or more tools for servicing the structure, wherein each of the rotating members that contact the structure is arranged on a respective one of said plurality of pivotable arms, and wherein the first arm from the at least one pair of first and second arms extends from the first support in an axial direction away from the second support, and the second arm from the at least one pair of first and second arms extends from the first support in an axial direction towards the second support.

15. The apparatus of claim 14, including a plurality of said pairs of first and second arms and first and second rotating members, circumferentially spaced around the first support.

16. The apparatus of claim 14, including a track arranged circumferentially around the frame, the carriage having a drive member that engages the track and is drivable so as to move the carriage around the track.

17. The apparatus of claim 14, including a guide rail for guiding the carriage circumferentially, the guide rail being attached to the second support.

18. The apparatus of claim 14, wherein the structure is a tapered structure and the arrangement of rotating members that contact the tapered structure on a respective one of said plurality of pivotable arms facilitates servicing of the tapered structure.

* * * * *